(12) United States Patent
Potter et al.

(10) Patent No.: US 11,820,279 B2
(45) Date of Patent: *Nov. 21, 2023

(54) LIGHT SYSTEM, METHOD OF FORMING TUNNELS OF LIGHT, A MOBILE 360° LIGHT SYSTEM, AND A METHOD OF CLEANING THE MOBILE 360° LIGHT SYSTEM

(71) Applicant: Valeo Vision, Bobigny (FR)

(72) Inventors: Brant Potter, Seymour, IN (US); Mark Pattison, Seymour, IN (US); John Orisich, Seymour, IN (US); Ambroise Servantie, Seymour, IN (US); Minesh Chaudhari, Seymour, IN (US); Frederick Roth, Seymour, IN (US)

(73) Assignee: Valeo Vision, Bobigny (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/689,085

(22) Filed: Mar. 8, 2022

(65) Prior Publication Data
US 2022/0186903 A1 Jun. 16, 2022

Related U.S. Application Data

(63) Continuation of application No. 17/039,036, filed on Sep. 30, 2020, now Pat. No. 11,293,619, which is a
(Continued)

(51) Int. Cl.
*B60Q 1/00* (2006.01)
*F21S 41/663* (2018.01)
(Continued)

(52) U.S. Cl.
CPC .............. *B60Q 1/0005* (2013.01); *B60Q 1/14* (2013.01); *B60Q 1/247* (2022.05); *F21S 41/25* (2018.01);
(Continued)

(58) Field of Classification Search
CPC .. F21V 23/0464; F21V 23/0471; F21V 13/04; F21V 21/145; F21V 21/22;
(Continued)

(56) References Cited

U.S. PATENT DOCUMENTS

| | | | |
|---|---|---|---|
| 3,683,842 | A | 8/1972 | Ogan |
| 4,413,451 | A | 11/1983 | Featherstone et al. |

(Continued)

FOREIGN PATENT DOCUMENTS

| | | |
|---|---|---|
| DE | 102013001274 A1 | 7/2014 |
| DE | 102017129291 A1 | 6/2019 |

(Continued)

OTHER PUBLICATIONS

International Search Report for Application No. PCT/US2020/053522, dated Mar. 23, 2021.

*Primary Examiner* — Peggy A Neils
*Assistant Examiner* — James M Endo
(74) *Attorney, Agent, or Firm* — Young Basile Hanlon & MacFarlane, P.C.

(57) ABSTRACT

A light system having: (a) a plurality of light sources connected to a vehicle and creating light that radiates away from the vehicle so that the light substantially surrounds the vehicle; and (b) one or more sensors that detect light from another light source; and wherein one or more of the plurality of light sources are turned off in a direction of the another light source while some of the plurality of light sources remain on so that a tunnel having a reduction or absence of light is formed in the direction of the another light source between the plurality of light sources that remain on.

20 Claims, 16 Drawing Sheets

Related U.S. Application Data continuation-in-part of application No. 16/856,273, filed on Apr. 23, 2020, now Pat. No. 10,907,802.

(60) Provisional application No. 62/912,258, filed on Oct. 8, 2019, provisional application No. 62/912,272, filed on Oct. 8, 2019.

(51) Int. Cl.

| | | |
|---|---|---|
| *F21S 41/30* | (2018.01) | |
| *F21S 41/25* | (2018.01) | |
| *F21V 23/04* | (2006.01) | |
| *B60Q 1/14* | (2006.01) | |
| *B60Q 1/24* | (2006.01) | |
| *F21Y 103/33* | (2016.01) | |
| *F21W 102/10* | (2018.01) | |
| *F21W 107/10* | (2018.01) | |
| *F21Y 115/10* | (2016.01) | |

(52) U.S. Cl.
CPC ............ *F21S 41/30* (2018.01); *F21S 41/663* (2018.01); *F21V 23/0464* (2013.01); *B60Q 2300/40* (2013.01); *F21W 2102/10* (2018.01); *F21W 2107/10* (2018.01); *F21Y 2103/33* (2016.08); *F21Y 2115/10* (2016.08)

(58) Field of Classification Search
CPC ...... F21V 17/02; F21V 17/007; F21V 15/012; B60Q 1/24; B60Q 1/143; B60Q 1/0005; B60Q 1/0017; B60Q 1/18; B60Q 1/2657; B60Q 1/2611; B60Q 1/2615; B60Q 1/2692; B60Q 1/2696; H05B 47/115; F21S 41/663; F21S 8/02; F21W 2102/17; F21Y 2105/16; F21Y 2105/18; F21Y 2107/30; F21K 9/65; B60S 1/60; B60S 1/62
See application file for complete search history.

(56) References Cited

U.S. PATENT DOCUMENTS

| | | | |
|---|---|---|---|
| 4,442,477 A | 4/1984 | Hennessey | |
| 4,712,167 A | 12/1987 | Gordin et al. | |
| 4,974,134 A * | 11/1990 | Bourne | F21V 23/00 362/802 |
| 5,068,770 A | 11/1991 | Baziuk | |
| 5,155,667 A | 10/1992 | Ho | |
| 5,546,286 A | 8/1996 | Branham | |
| 5,782,549 A | 7/1998 | Glatzmeier et al. | |
| 6,138,319 A | 10/2000 | Benoit | |
| 6,189,808 B1 | 2/2001 | Daniels et al. | |
| 6,443,604 B1 * | 9/2002 | Rudenberg | H05B 47/19 362/276 |
| 6,452,488 B1 * | 9/2002 | He | B60R 25/104 340/472 |
| 6,991,351 B1 * | 1/2006 | Petrick | F21V 29/767 340/815.45 |
| 7,635,195 B2 * | 12/2009 | Tarter | F21L 4/04 362/186 |
| 8,662,704 B2 | 3/2014 | Carraher et al. | |
| 9,764,680 B2 | 9/2017 | Tamay | |
| 9,802,528 B2 | 10/2017 | Adami | |
| 9,849,830 B1 | 12/2017 | Salter et al. | |
| 10,279,726 B2 | 5/2019 | Wama et al. | |
| 10,907,802 B1 * | 2/2021 | Pattison | B60Q 1/0023 |
| 11,293,619 B2 * | 4/2022 | Potter | B60Q 1/05 |
| 2003/0206416 A1 * | 11/2003 | Mullally | F21V 15/01 362/249.02 |
| 2005/0057941 A1 * | 3/2005 | Pederson | F21S 10/06 362/542 |
| 2005/0270778 A1 | 12/2005 | Hicok et al. | |
| 2006/0002122 A1 * | 1/2006 | Griffin | B60Q 1/52 362/386 |
| 2008/0037265 A1 | 2/2008 | Hsu | |
| 2008/0055896 A1 | 3/2008 | Feldmeier | |
| 2009/0196057 A1 | 8/2009 | Case et al. | |
| 2011/0110089 A1 * | 5/2011 | Chang | F21V 19/001 362/249.02 |
| 2011/0211340 A1 * | 9/2011 | Smith | F21L 4/04 362/191 |
| 2012/0314418 A1 | 12/2012 | Byrne et al. | |
| 2013/0039081 A1 | 2/2013 | Czipri et al. | |
| 2013/0128603 A1 | 5/2013 | Chen | |
| 2013/0242100 A1 | 9/2013 | Seki | |
| 2014/0085072 A1 * | 3/2014 | Clifford | H05B 45/12 340/472 |
| 2014/0307460 A1 | 10/2014 | Li | |
| 2015/0353000 A1 | 12/2015 | Kowatzki | |
| 2016/0185299 A1 | 6/2016 | Kawashiri et al. | |
| 2016/0318438 A1 * | 11/2016 | Wadell | H05B 47/19 |
| 2016/0325715 A1 * | 11/2016 | Niemczyk | B60S 1/528 |
| 2017/0120800 A1 | 5/2017 | Linan et al. | |
| 2017/0182931 A1 * | 6/2017 | Son | B60Q 1/1423 |
| 2017/0246985 A1 | 8/2017 | Dellock et al. | |
| 2017/0346997 A1 | 11/2017 | Sato et al. | |
| 2017/0368982 A1 * | 12/2017 | Dellock | F21S 41/322 |
| 2018/0001837 A1 * | 1/2018 | Trebouet | B60S 1/528 |
| 2018/0009418 A1 | 1/2018 | Newman | |
| 2018/0072219 A1 | 3/2018 | Harris et al. | |
| 2018/0208104 A1 | 7/2018 | Kennemer et al. | |
| 2018/0236928 A1 | 8/2018 | Fritz et al. | |
| 2018/0339645 A1 * | 11/2018 | Ekkizogloy | F21S 41/00 |

FOREIGN PATENT DOCUMENTS

| | | | | |
|---|---|---|---|---|
| EP | 3092882 A1 | 11/2016 | | |
| EP | 3100909 A1 | 12/2016 | | |
| WO | 2019050939 A1 | 3/2019 | | |
| WO | WO-2019050939 A1 * | 3/2019 | ........... | B60Q 1/0023 |

* cited by examiner

| Min Illumination | Distance Radius |
|---|---|
| (X) lux | (Y + 20) m |
| (2X) lux | (Y+12) m |
| (4X) lux | (Y+4) m |
| (8X) lux | (Y) m |

LIGHT SYSTEM, METHOD OF FORMING TUNNELS OF LIGHT, A MOBILE 360° LIGHT SYSTEM, AND A METHOD OF CLEANING THE MOBILE 360° LIGHT SYSTEM

CROSS-REFERENCE TO RELATED APPLICATIONS

This application is a continuation application of patent application Ser. No. 17/039,036 filed on Sep. 30, 2020 and is a continuation-in-part of patent application Ser. No. 16/856,273 filed on Apr. 23, 2020, now U.S. Pat. No. 10,907,802 and claims priority to and the benefit of U.S. Provisional Application Ser. No. 62/912,272 and U.S. Provisional Application Ser. No. 62/912,258, both filed Oct. 8, 2019. The entire disclosure of all related applications is hereby incorporated by reference.

FIELD

The present teachings relate to a light system including light banks that selectively turn on and off to form tunnels while light is provided to a near region; a method of controlling the light system; and a light system that is movable between various vehicles and light system is capable of providing 360 degrees of light.

BACKGROUND

Headlights in vehicles typically are static in position and once aimed maintain the aim. In order to illuminate a larger area the headlights are switched from a low beam to a high beam. Attempts have been made to switch between high beams and low beams when other vehicles approach. Lights of vehicles are typically static in position and once aimed maintain the aim. These lights are generally fixed within or on the vehicle. When these lights are used in industrial or commercial settings these lights may become dirty or blocked. Moreover, if a vehicle is being used during daylight the light system may become dirty so that when the light system is used at night the light system may be dirty from the daytime use. Additionally, if multiple pieces of equipment are used at nighttime a light system may need to be installed on each piece of equipment.

Examples of light systems may be disclosed in U.S. Pat. Nos. 3,683,842; 4,413,451; 4,704,661; 4,712,167; 9,764,680; 10,253,941 and US Publication No. 2005/0270778 all of which are expressly incorporated herein by reference for all purposes. Thus, there is a need for a system that provides light 360° around a vehicle. It would be desirable to have a light system that is movable from vehicle to vehicle. There is a need for a system that can move between an open position and a closed position. It would be desirable to have a system that is self-cleaning. There is a need for a system that provides tunnels so that light is not directed towards an oncoming vehicle. It would be desirable to have a method of selectively turning on and off lights within the lighting system to form tunnels. There is a need for a system that lightens a near region and lightens a far region. It would be desirable to have a system where the far lights are selectively turned on and off while the near lights remain on.

SUMMARY

The present teachings provide: a light system comprising: (a) a base that is configured to connect to a vehicle; (b) a light layer that is movable into the base in a closed configuration and out of the base in an open configuration; and (c) a cap located above the base and the light layer, the cap enclosing the light layer within the base when the light system is in the closed configuration.

The present teachings provide: a light system comprising: (a) a base; (b) a light layer including a plurality of lights that project light substantially around a periphery of the light system; (c) a cleaning system located completely or partially within the base, the cleaning system being configured to clean the light layer; and (d) a cap located above the light layer.

The present teachings provide: a method comprising: spraying a fluid across a plurality of lights to clean the plurality of lights and moving the plurality of lights along a longitudinal axis between an open configuration where the plurality of lights provide light to surroundings and a closed configuration where the plurality of lights are protected from dirt, debris, ultra violet light, or a combination thereof.

The present teachings provide: a light system comprising: (a) a plurality of light sources connected to a vehicle and creating light that radiates away from the vehicle; and (b) one or more sensors that detect light from another light source; and wherein one or more of the plurality of light sources are turned off in a direction of the another light source while some of the plurality of light sources remain on so that a tunnel having a reduction or absence of light is formed in the direction of the another light source between the plurality of light sources that remain on.

The present teachings provide: a light system comprising: (a) a plurality of light banks comprising: (i) one or more near lights and (ii) one or more far lights that operate at a same time as the one or more near lights to lighten a segment around a vehicle; wherein the one or more near lights, lighten a region of the segment from the vehicle to a first distance from the vehicle and the one or more far lights, lighten a second region of the segment from the first distance to a second distance.

The present teachings provide: a method comprising: (a) lighting a plurality of light banks comprising one or more near lights and one or more far lights that operate at a same time so that a plurality of segments around a vehicle are lightened; (b) sensing light of an oncoming vehicle; (c) selecting one or more of the one or more far lights of the plurality of light banks; and (d) turning off the selected one or more of the one or more far lights to form a tunnel between the one or more far lights that remain on.

The present teachings provide a system that provides light 360° around a vehicle. The present teachings provide a light system that is movable from vehicle to vehicle. The present teachings provide a system that can move between an open position and a closed position. The present teachings provide a system that is self-cleaning. The present teachings provide a system that provides tunnels so that light is not directed towards an oncoming vehicle. It would be desirable to have a method of selectively turning on and off lights within the lighting system to form tunnels. The present teachings provide. The present teachings provide a method of selectively turning on and off lights within the lighting system to form tunnels. The present teachings provide a system that lightens a near region and lightens a far region. The present teachings provide a system where the far lights are selectively turned on and off while the near lights remain on.

BRIEF DESCRIPTION OF THE DRAWINGS

FIG. 12 is a light bank including all of the near lights off and all but one of the far lights on.

FIG. 14 is a light bank including all of the near lights on and all but one of the far lights on.

FIG. 15A illustrates a light pattern of a light bank with all of the far lights and near lights on.

FIG. 18A is a light bank including all of the far lights on and all of the near lights on.

FIG. 18B is a light bank including two of the far lights on and two off and all of the near lights on.

DETAILED DESCRIPTION

Figure 1A:
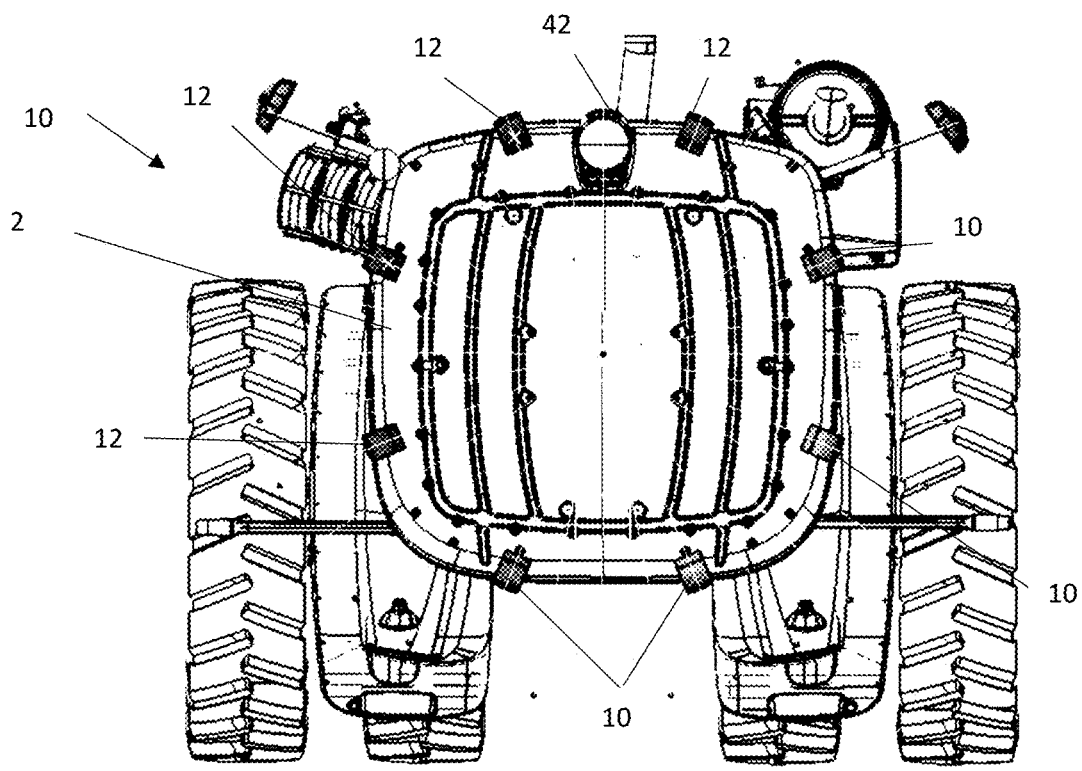
FIG. 1A is a top view of a vehicle including the light system.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located with a vehicle. Preferably, the light system may be used with a car, motorcycle, bus, truck, semi-truck, SUV, XUV, four-wheeler, dirt bike, an autonomous vehicle, a taxi, or a combination thereof. More preferably, the light system may be used with a commercial vehicle, an industrial vehicle, military vehicles, or an agricultural vehicle. The light system may be installed on farm equipment (e.g., a tractor, combine, grain cart, harvester); industrial equipment (e.g., front end loader, backhoe, excavator, dump truck, skid steer loader); or other commercial equipment (e.g., tow truck) that operate at night. The light system may project in a forward direction, rear direction, side direction, or a combination thereof. The light system may project light in two or more directions of a vehicle (e.g., forward and a side, forward and the rear). The light system may provide light that substantially surrounds or extends substantially around the vehicle (e.g., 180 degrees or more, 270 degrees or more, or 360 degrees around the vehicle). The light system may provide light so that 180 degrees or more, 225 degrees or more, 275 degrees or more, 315 degrees or more, 335 degrees or more, or 360 degrees around a vehicle is illuminated. Preferably, the light system projects a light 360 degrees around the vehicle. The light system may be integrated into a front end, a rear end, or both of a vehicle. Preferably, the light system is installed on an upper region of a vehicle (e.g., a roof). The light system may project light out away from the vehicle. The light system may be integrated into the vehicle. The light system may be added as an aftermarket system. The light system may be movably attached to the vehicle. The light system may be self-contained so that once a desired task is complete the light system may be removed and moved. The light system may be fixedly attached to the vehicle. Brackets may be added to the vehicle so that the light system may be connected. The light system may connect directly to parts of the vehicle via welding, fasteners, clips, or a combination thereof. The light system may be integrated into the vehicle. The light system may be attached to the vehicle so that the vehicle is not damaged (e.g., non-destructive devices). The light system may include suction, anti-skid, straps, clamps, or a combination thereof. The light system may be installed using bolts, anchors, fasteners, or a combination thereof. All or a portion of the light system may be directly connected to or in communication with a vehicle. The light system may be indirectly connected to a vehicle. The light system may include one or more banks of lights. The bank of lights may include a baffle.

The baffle functions to connect a near light bank to a far light bank, near lights to adjacent near lights, far lights to adjacent far lights, near lights to far lights, a light source to a reflector, multiple lights together, or a combination thereof. The baffle may house all of the near lights and the far lights to form a light bank that may be connected to a vehicle, a platform, a bracket, or a combination thereof. The baffle may hold a reflector and a light relative to one another. The baffle may hold a collimator and a light relative to one another. The baffle may prevent peripheral light (e.g., light that goes off to the side or towards a driver of a vehicle). The baffle may hold a reflector or a collimator in a fixed position. The baffle may hold a light source and the light source may be movable relative to the baffle, reflector, collimator, or a combination for adjustment (e.g., fine adjustment). The baffle may be moved so that the reflector or collimator and the light source are all adjustable together (e.g., gross adjustment). An entire row of baffles or bank of baffles may all be adjusted together. The baffle may be made of a reflective material. The baffle may be made of an opaque or absorptive material. The baffle may be one large piece where all of the lights are fixed relative to each other. The baffle may be an individual piece for each of the lights so that each baffle may be moved relative to an adjacent baffle. The baffles may be connected together or connected to a support to form a light bank.

The light banks function to provide light to one or more locations of interest. The light banks may provide light so that dark spots are not created around a vehicle. The light banks may selectively turn off one or more lights during operation (e.g., near lights, far lights, intermediate lights (or mid lights), or a combination thereof). The light banks may be radially spaced apart around an outer periphery of the light layer (i.e., a layer where light is directed away from a vehicle or a layer where the light banks are located). Each light bank may include one or more rows of lights. Each light bank may include one or more rows of lights located above one or more adjacent rows of lights. For example, a light bank may include a row of lights located above another row of lights. The rows of lights may include one or more, two or more, three or more, or four or more light sources. Each row of lights may include 10 or less, 8 or less, or 6 or less light sources. The light banks may each include one or more regions, light sources, or both. The light banks may include one or more regions or one or more group of lights that provide light to one or more regions. Each of the lights in a light bank may overlap lights within the light bank or adjacent light banks. For example, each light may include an overlap. The overlap may be about 2 percent or more, about 5 percent or more, or about 10 percent or more with one or more adjacent light sources. The overlap may be about 25 percent or less, 20 percent or less, or 15 percent or less. For example, 5 percent of a light may overlap a light source on a first side and 5 percent may overlap a light on a second side, 5 percent may overlap a light source in the front and/or back of the light source. The overlap may blend two or more lights together. The overlap may be on a left side, right side, front side, rear side, or a combination thereof. The near lights, intermediate lights, far lights, or a combination thereof may all include an overlap. The light bank may include one light bank, two or more light banks, or three or more light banks. For example, the light bank may include a bank (e.g., row) of lights that are near lights (e.g., near light bank), a bank of lights that are intermediate lights, (e.g., intermediate light bank), a bank of lights that are far lights (e.g., far light bank), or a combination thereof.

The near light bank functions to project light proximate to a vehicle or a region proximate to a vehicle relative to an intermediate light bank and a far light bank. The near light bank functions to create a near region or a near region of light. The near light bank may include one or more lights, two or more lights, three or more lights, four or more lights, ten or less lights, eight or less lights, or six or less lights. The number of lights in the near light bank may be different than a number of lights in a far light bank, the intermediate light bank, or both. For example, there may be one near light for every two far lights. In another example, the near light bank may have 1 light for every 2 intermediate lights and every 3 far lights.

The intermediate light bank (or mid light bank) functions to project light in a region between near light and far light. The intermediate light bank may include one or more lights, two or more lights, three or more lights, four or more lights, ten or less lights, or eight or less lights. The intermediate light bank may form the intermediate light discussed herein. The intermediate light bank may blend the light from the near light bank and the far light bank. The light bank may be free of an intermediate light bank. The intermediate light bank may be located within a light bank between the far light bank and near light bank, above both the far light bank and the near light bank, below both the far light bank and the near light bank, or a combination thereof.

The far light bank functions to project light a distance from the vehicle so that distant objects or objects on the horizon are illuminated. The far light bank may project light further than the near light and the intermediate light. The far light bank may include one or more lights, two or more lights, three or more lights, four or more lights, ten or less lights, eight or less lights, or six or less lights. The far light bank may include the largest light, the brightest lights, or both. The light bank including at least the near light bank and the far light bank may for one or more regions. The light bank may include at least a near region and a far region (and may also include an intermediate region) and the light banks may be adjusted so that the region illuminated by each light may be adjusted (e.g., a far light adjustment, adjacent light adjustment, near light adjustment).

The far light adjustment and the near light adjustment function to move the far light and the near light respectively so that a user may adjust the light to predetermined location or a desired location. The far light adjustment may adjust the light horizontally, vertically, a focus of the light, a spread of the light, change an angle the light is directed, or a combination thereof. The far light adjustment may move the light source relative to the reflector, the collimator, or both. The far light adjustment may provide gross adjustment of the light extending from the light system. The far light adjustment may be located on a side of a baffle, a top of a baffle, connected to the light source, the light source may be mounted on the far light adjustment, or a combination thereof. The far light adjustment may move the baffle, move a light source, move a reflector, move a collimator, move a light bank, move a portion of a light bank, or a combination thereof. The far light adjustment may move the light within a far region or to overlap a portion of a near region. The near light adjustment may adjust the light horizontally, vertically, a focus of the light, a spread of the light, change an angle the light is directed, or a combination thereof. The near light adjustment may move the light source relative to the reflector, the collimator, or both. The near light adjustment may provide gross adjustment of the light extending from the light system. The near light adjustment may be located on a side of a baffle, a top of a baffle, connected to the light source, the light source may be mounted on the near light adjustment, or a combination thereof. The near light adjustment may move the baffle, move a light source, move a reflector, move a collimator, move a light bank, move a portion of a light bank, or a combination thereof. The near light adjustment may move the light within a near region.

The near region includes one or more light sources that function to illuminate objects at a distance of about 9 m or less, about 8 m or less, or about 7 m or less from a vehicle. The near region may illuminate objects a distance of about 1 m or more, about 2 m or more, or about 3 m or more from a vehicle. The intensity of light from light sources in the near region may be less than an intensity of light from the light sources in the far region or an intermediate region. The intensity of light from the light sources in the near region may be about 5,000 lumens or more, about 7,500 lumens or more, or about 9,000 lumens or more when measured at a distance where the near region and an intermediate region or a far region intersect (e.g., 9 m from a vehicle). The intensity of light from the light sources in the near region may be about 15,000 lumens or less or about 10,000 lumens or less when measured at a distance where the near region and the intermediate region or the far region intersect. The near region may illuminate areas directly around the vehicle. The near region may remain on at all times of operation of the light system. The near region may include one or more light sources in each light bank. The near region may include two or more, three or more, four or more, six or more, ten or more, or twenty or less light sources in each light bank. The near region may be partially overlapped by one or more intermediate region light sources.

The intermediate region includes one or more light sources that function to illuminate objects at a distance of about 25 m or less, about 23 m or less, or about 21 m or less from a vehicle. The near region may illuminate objects a distance of about 7 m or more, about 9 m or more, or about 11 m or more from a vehicle. The intermediate region may project light that overlaps with the near light, the far light, or both. The intensity of light from light sources in the intermediate region may be less than an intensity of light from the light sources in the far region but greater than that of the near region. The light system may be free of an intermediate region or intermediate lights. The intensity of light from the light sources in the intermediate region may be about 15,000 lumens or more, about 20,000 lumens or more, or about 25,000 lumens or more when measured at distance where the intermediate region and far region intersect (e.g., 20 m in a vehicle). The intensity of light from the light sources in the intermediate region may be about 30,000 lumens or less or about 32,000 lumens or less when measured at a distance where the intermediate region and the far region intersect. The intermediate region may illuminate areas directly around the vehicle. The intermediate region may remain on at all times of operation of the light system. The intermediate region may have light sources that may be selectively turned off. The intermediate region may include one or more light sources in each light bank. The intermediate region may include two or more, three or more, four or more, or six or less light sources in each light bank. The light sources of the intermediate region may be located above the near region light sources and below the far region light sources.

The far region includes one or more light sources that function to illuminate objects at a distance of about 50 m or less, about 45 m or less, or about 40 m or less from a vehicle. The far region may illuminate objects a distance of about 10 m or more, about 15 m or more, or about 20 m or more from a vehicle. The intensity of light from light sources in the far region may be less than an intensity of light from the light sources in the near region, the intermediate region, or both. The intensity of light from the light sources in the far region may be about 25,000 lumens or more, about 30,000 lumens or more, about 35,000 lumens or more, or about 40,000 lumens or more (e.g., about 42,000 lumens) when measured at distance where the intensity of the far light plateaus (e.g., 40 m from a vehicle). The intensity of light from the light sources in the far region may be about 50,000 lumens or less or about 45,000 lumens or less when measured at a distance where the light intensity plateaus. The far region may illuminate areas farthest around the vehicle relative to the other regions. The far region may be selectively turned off when other vehicles or people are detected. The far region may include one or more light sources in each light bank. The far region may include two or more, three or more, four or more, or six or less light sources in each light bank.

The light source functions to produce light. The light source may be a device or plurality of devices that create light and the light extends outward from the light source. The light source may produce a high beam, a low beam, or both. The light source may be aimed for near field, intermediate field, or far field. The light source may be any type of lighting device that produces light such as an incandescent bulb, fluorescent light, compact fluorescent lamp, halogen lamp, light emitting diode (LED), laser diode, high intensity discharge lamps (HID); halogen lights, xenon lights, any other light source, or a combination thereof. The light source may be a single lamp or bulb. Preferably, the light source includes a plurality of lamps, bulbs, diodes, or a combination thereof. The light source may be one LED and a reflector or one LED and a collimator. The light source may be an array. The light source may include two or more, 5 or more, 10 or more, 20 or more, or even 50 or more devices that produce light and combine together to form the light source. The light source may include 500,000 or less, 300,000 or less, 200,000 or less, 100,000 or less, or 50,000 or less devices that produce light. For example, if the light source is a 10×10 array of light devices some of the 100 devices may be selectively turned on and off, dimmed, brightened, or a combination thereof to create patterns, images, words, text, numbers, shapes, dark spots, bright spots, or a combination thereof. The light source may be static. The light source may be free of movement relative to the light layer. The light source may be fixed within the light bank or the light layer. The light source may be fixed and the light from the light source may be moved, bent, directed, or a combination thereof by optical elements. The light from the light source may be moved or aimed from near field to far field or vice versa. Near field may include a projection onto the ground or a road surface. A driver may control movement between near field, intermediate field, and far field. The light system may automatically adjust between far field, intermediate field, and near field. Each device of the light source may be turned on an off. The color, intensity, shape, or a combination thereof of each device of the light source may be controlled or adjusted. For example, some devices may be turned red and other devices may remain white. The light source may direct light to a driving surface or ground around a vehicle. For example, a center of the light may be located on the driving surface or ground around a vehicle. The light source may direct light above a driving surface (e.g., some light may contact and illuminate the driving surface but a center of the light may be located above the driving surface). The light source may be directed substantially parallel to the driving surface or ground. For example, a center of the light, an axis of the light, or both may extend parallel to the driving surface. The light source may extend along an axis or may be directed away from the axis.

The light source may be comprised up of a plurality of segments. The light source may have radial segments, vertical segments, or both. The plurality of segments may project light in a forward direction, a rearward direction, or both relative to a vehicle. The plurality of segments may project light to cover an angle of about 60 degrees or more, 90 degrees or more, 120 degrees or more, 180 degrees or less in the forward direction, the rearward direction or both relative to the vehicle. The plurality of light sources may project light in a forward direction and one or more additional directions of the vehicle (e.g., rear direction, right direction, left direction, or a combination thereof). The plurality of segments (e.g., radial segments) function to surround the vehicle, create 360 degrees or light, break up the vehicle into a plurality of regions that are illuminated, are pie shaped, or a combination thereof. The light source may include 10 or more segments, 20 or more segments, 25 or more segments, 30 or more segments, 40 or more segments, 50 or more segments, 60 or more segments, or even 70 or more segments (e.g., radial segments). The light source may include 200 or less segments, 150 or less segments, 100 or less segments, or 75 or less segments (e.g., radial segments). Preferably, the light source is broken up into from about 24 segments to about 72 segments (e.g., radial segments) to create a perimeter (e.g., circle or oval) around the vehicle. Each segment may span about 2 degrees or more, about 5 degrees or more, about 7 degrees or more, about 10 degrees or more, or about 12 degrees or more. Each segment may span about 25 degrees or less, about 20 degrees or less, or about 15 degrees or less. For example, if each light spans 15 degrees and there are 27 segments the segments will have about 45 degrees of total overlap between all of the segments. The number of segments is inversely proportional to the degrees each segment spans. The light source may directly provide light (e.g., light may extend from the light source outward away from the vehicle). The light source may provide indirect light (e.g., light may extend from the light source towards a vehicle and then another device may direct the light away from the vehicle). The light source may be directed towards a reflector and then the reflector may direct the light outward from a vehicle. Each radial segment may include one or more vertical segments.

The vertical segments function to break a length into two or more even three or more segments. For example, a first light may illuminate a first distance and a second light may illuminate a second distance that begins at or overlaps with the first light. The vertical segments may span a same radial distance but may only cover a region up to a distance from the vehicle. The vertical segments may be created by the near lights, intermediate lights, the far lights, or a combination thereof. The vertical segment may be a radial distance from a vehicle with the vehicle being the center. Each light bank may include two or more vertical segments and two or more radial segments. Each of the vertical segments may have an intensity of light.

The intensity of light may be measured at a distance from a vehicle. The intensity of light may decrease as a measurement is taken further and further from the vehicle. An intensity of light from a near light source may be greater than an intensity of light from an intermediate light source, a far light source, or both due to the distance each is measured. The intensity of light from the far light source may be greater than an intensity of light from the intermediate light source and the near light source of all of the sources are measured from a same distance. An intensity of the overall light source may reduce by between about 25% and 50% for every 4-8 m further from the vehicle a measurement is taken. For example, if a measurement is taken at 18 m and the illumination is 16 lx then if a measure is taken at about 26 m the illumination may be about 8 lx.

The intensity at a distance of about 14 m from a vehicle may be about 20 lx or more, about 25 lx or more, about 30 lx or more, about 40 lx or less, or about 35 lx or less. The intensity at a distance of about 18 m from a vehicle may be about 5 lx or more, about 10 lx or more, about 15 lx or more, about 25 lx or less, or about 20 lx or less. The intensity at a distance of about 26 m from a vehicle may be about 2 lx or more, about 4 lx or more, about 6 lx or more, about 8 lx or more, about 20 lx or less, about 15 lx or less, or about 10 lx or less. The intensity at a distance of about 34 m from a vehicle may be about 1 lx or more, about 2 lx or more, about 4 lx or more, about 15 lx or less, about 10 lx or less, or about 5 lx or less. Each light bank may include reflectors that direct light to one or more of the segments.

The reflector functions to direct light to a predetermined region or area. The reflector may redirect light or reflect from a light source away from a vehicle. The reflector may blend light sources, lighten a predetermined region so that adjacent regions are illuminated by adjacent light sources. The reflector may be made of or include a reflective material. The reflector may be made of or include silver, aluminum, glass, a mirror, or a combination thereof. Preferably, the reflector is a polycarbonate covered in aluminum. Each light bank may include a single reflector for each light source. For example, if a light bank has four reflectors then the light bank has at least four light sources. Each light bank may include a plurality of reflectors. Each light source may include a single reflector. A plurality of reflectors may be located in each light bank. For example, if a light bank includes six lights then each light source is located proximate to a reflector (e.g., whether each reflector is combined into a single piece or a plurality of discrete pieces). The light bank may include a reflector, a lens, a collimator, or a combination thereof.

The near light reflector functions to reflect light from a light source to a near region. The near light reflector may determine a size of the near region. The near light reflector may have a set spread of light. For example, the near light reflector may reflect light at a predetermined area, angle, or both. The near light reflector may reflect light at a predetermined angle or predetermined area and the near light reflector may be moved to adjust the region that is illuminated by the reflected light. The near light reflector may reflect light so that an overlap is created between the light from the near light reflector and light from adjacent near light reflectors, adjacent far light reflectors, or both. The near light reflectors may be planar, may have curved edges, may have a concave portion, may be parabolic, may have a vertical curvature, may have a horizontal curvature, may have linear regions, or a combination thereof. A curvature of the near light reflector may determine a distance a lamp axis of the light contacts the ground. For example, the shape of the near light reflector may be selected so that a lamp axis may be aimed at a location a predetermined distance from a vehicle (e.g., 5-10 m). The predetermined distance of the aimed location from a near light reflector may be 2 m or more, 5 m or more, 7 m or more, 10 m or more, 20 m or less, 15 m or less, or 12 m or less. The near light reflector may be located above a far light reflector. The near light reflector may be located below a far light reflector.

The far light reflector functions to reflect light from a light source to a far region. The far light reflector may determine a size of the far region. The far light reflector may have a set spread of light. For example, the far light reflector may reflect light at a predetermined area, angle, or both. The far light reflector may reflect light at a predetermined angle or predetermined area and the far light reflector may be moved to adjust the region that is illuminated by the reflected light. The far light reflector may reflect light so that an overlap is created between the light from the far light reflector and light from adjacent near light reflectors, adjacent far light reflectors, or both. The far light reflectors may be planar, may have curved edges, may have a concave portion, may be parabolic, may have a vertical curvature, may have a horizontal curvature, or a combination thereof. A curvature of the far light reflector may determine a distance a lamp axis of the light contacts the ground or an angle of reflected light above the ground. For example, the shape of the far light reflector may be selected so that a lamp axis may be aimed at a location a predetermined distance from a vehicle (e.g., 10-40 m). The predetermined distance of the aimed location from a far light reflector may be 10 m or more, 20 m or more, 30 m or more, 40 m or more, 100 m or less, 75 m or less, or 50 m or less. The far light reflector may be located above a near light reflector. The far light reflector may be located below a near light reflector. The far light reflector and the near light reflector receive direct light from light sources and reflect the light (e.g., reflected light) away from a vehicle.

The direct light functions to travel from the light source towards a reflector or a collimator. The direct light may directly extend away from a vehicle. Each light bank may provide a plurality of direct light. The direct light may be reflected away from a vehicle. The direct light may be aimed to a region around a vehicle (e.g., a near region, an intermediate region, a far region). The direct light may overlap one or more adjacent regions, two or more adjacent regions, three or more adjacent regions, or four or more adjacent regions. The direct light may be directed through a collimator, a lens, or both. The direct light may be directed towards a reflector. The direct light once contacted with a reflector may become reflected light. Each light bank may provide a combination of direct light and reflected light, only direct light, or only reflected light.

The reflected light functions to travel away from a vehicle and to illuminate a predetermined region. Each light bank may provide a plurality of reflected lights. The reflected light may illuminate a predetermined region, a near region, an intermediate region, a far region, or a combination thereof. The reflected light may overlap one or more adjacent regions, two or more adjacent regions, three or more adjacent regions, or four or more adjacent regions. The reflected light may be moved by adjusting the reflector, a spatial relationship between the reflector and the light source, or both. The reflected light may have an angle of coverage, an area of coverage, an area of overlap, or a combination thereof. The reflected light may only occur when a reflector is used. A reflector and reflected light may not be present when a collimator is used.

A collimator functions to direct light from a light source to a location of interest. The collimator directs light generally in a direction the light is already heading. For example, the light is direct light and is headed away from the vehicle and the collimator redirect the light to a location of interest that is located away from the vehicle. The collimator may redirect direct light. The collimator may have a parabolic shape. The collimator may have a round cross section. The collimator may be a near collimator, an intermediate collimator, a far collimator, or a combination thereof. Each of the collimators may have substantially a same outside shape. The inside of each of the different types of collimators may vary.

The near collimator functions to direct light to a location proximate to the ground, to the ground, or both. The near collimator may change a direction the light travels one or more times, two or more times, or three or more times. The near collimator may have a total angle change (e.g., a sum of all of the angle changes of the light from the light source to exiting the collimator). The total angle of change of the light by the near collimator may be about 25 degrees or more, about 45 degrees or more, about 60 degrees or more, about 90 degrees or more, about 115 degrees or more, or even about 125 degrees or more, The total angle of change of the light by the near collimator may be about 225 degrees or less, about 200 degrees or less, or about 175 degrees or less. Some of the light may only be reflected one time and some of the light may be reflected more than one time. Thus, some light may only change by an angle of about 25 degrees and some of the light may change by an angle of about 200 degrees. The near collimator may direct substantially all of the light out of the near collimator and then down towards the ground. The near collimator may direct the light a distance away from the vehicle. The near collimator may direct light a distance of about 2 m or more, about 4 m or more, about 6 m or more, about 8 m or more, about 10 m or more. The near collimator may direct light a distance of about 25 m or less, about 20 m or less, or about 18 m or less. The near collimator may change the light at a greater angle then the intermediate collimator and the far collimator.

The intermediate collimator functions to direct light to a location proximate to the ground, to the ground, or both and further from the vehicle than light from the near collimator but at a shorter distance than the far collimator. The intermediate collimator may change a direction the light travels one or more times, two or more times, or three or more times. The intermediate collimator may have a total angle change (e.g., a sum of all of the angle changes of the light from the light source to exiting the collimator). The total angle change of the light from the intermediate collimator may be about 20 degrees or more, about 35 degrees or more, about 50 degrees or more, about 75 degrees or more, about 90 degrees or more, or even about 105 degrees or more, The total angle change of the light from the intermediate collimator may be about 180 degrees or less, about 155 degrees or less, or about 125 degrees or less. Some of the light may only be reflected one time and some of the light may be reflected more than one time. Thus, some light may only change by an angle of about 25 degrees and some of the light may change by an angle of about 150 degrees. The intermediate collimator may direct substantially all of the light out of the intermediate collimator and then angled outwards and down towards the ground. The intermediate collimator may direct the light a distance away from the vehicle. The intermediate collimator may direct light a distance of about 12 m or more, about 14 m or more, about 16 m or more, about 18 m or more, about 20 m or less. The intermediate collimator may direct light a distance of about 35 m or less, about 30 m or less, or about 25 m or less. The intermediate collimator may direct the light so that some light overlaps light from the near collimator, the far collimator, an adjacent intermediate collimator, or a combination thereof. The intermediate collimator may change the light at a greater angle then the far collimator but less than the near collimator.

The far collimator functions to direct light to a location parallel to the ground, proximate to the ground, to the ground or a combination thereof and further from the vehicle than the light from near collimator and the intermediate collimator. The far collimator may change a direction the light travels one or more times, two or more times, or three or more times. The far collimator may have a total angle change (e.g., a sum of all of the angle changes of the light from the light source to exiting the collimator). The total angle change of the light from the far collimator may be about 20 degrees or more, about 35 degrees or more, about 50 degrees or more, about 75 degrees or more, about 90 degrees or more, or even about 105 degrees or more, The total angle change of the intermediate collimator may be about 175 degrees or less, about 145 degrees or less, or about 125 degrees or less. Some of the light may only be reflected one time and some of the light may be reflected more than one time. Thus, some light may only change by an angle of about 25 degrees and some of the light may change by an angle of about 135 degrees. The far collimator may direct substantially all of the light out of the far collimator and then angled outwards and down towards the ground. The far collimator may direct the light a distance away from the vehicle. The far collimator may direct light a distance of about 18 m or more, about 20 m or more, about 25 m or more, about 30 m or more, about 32 m or less. The far collimator may direct light a distance of about 50 m or less, about 40 m or less, or about 35 m or less. The far collimator may direct the light so that some light overlaps light from the near collimator, the intermediate collimator, an adjacent far collimator, or a combination thereof. The near collimator, intermediate collimator, far collimator, or a combination thereof may all include facets.

The facets function to change a direction of light moving through a collimator. The facets may be located in or part of a side wall, an end, a cover, or a combination thereof. The facets may change an angle of the light, redirect the light, direct light to a region, or a combination thereof. The facets in the end may scatter the light so that the light extends straight and towards the sidewall. The facets in the end may diffuse the light so that light extends through substantially an entire cover. The facet in the end may be a lens that changes a direction of the light. The facet in the end not substantially effect transmission of light therethrough. The facets in the sidewall may redirect the light towards the cover, out of a front of the collimator, or both. The facets in the sidewall may direct the light downward, outward, or both. The facets in the sidewall may direct all of the light to the cover. The cover may be free of facets. The cover may include a plurality of facets. The cover may be a clear lens that allows light to pass through. The facets in the cover may aim the light to a location of interest. For example, facets in the far collimator may direct light substantially outward and generally parallel to the ground and the near collimator facets may direct light generally downward towards the ground. The facets in the cover may condense the light to cover a predetermined region (e.g., near region, intermediate region, far region). The facets may be a variation in thickness of portions of the collimator so that light is redirected when the light contacts a facet. The facets may change an angle light travels by any of the angles discussed herein.

The sidewall functions to extend outward away from the light source and to direct the light outward from the collimator and vehicle. The sidewall may redirect the light toward the cover. The sidewall may prevent the light from straying out of the collimator. The sidewall may have a curved shape. The sidewall may be rounded. The sidewall may extend between a cover and an end.

The cover functions to prevent debris, fluids, or both from entering the collimator, to redirect light, to form an outward surface that light passes through, or a combination thereof. The cover may include facts. The cover may determine an angle the light extends outward from the collimator. The cover may be made of the same material as the end, the sidewall, or both. The cover, end, sidewall, or a combination thereof may be one monolithic piece. The cover, end, and sidewall may be discrete parts. The cover may be connected to the sidewall. The cover and the end may extend parallel to each other.

The end functions to connect to a light source or to hold a light source in place. The end may enclose a first end of the collimator and the cover may enclose a second end of the collimator. The end may direct light into the collimator. The end may disperse light. The light source may be abutted against the end. The light source may be connected to the end. The light source may be located in a recess in the end. The recess in the end may surround the light source. The light source may be spread by the recess within the end. The recess in the end may direct light towards the sidewall. The recess in the end may direct light towards the cover. The recess may be a concave portion of the end that extends towards the cover. The recess may be an open area in center of the collimator. The light source may direct light into the end. A light source may be located between an end of the collimator and a heat sink.

The light source may be located on the optical axis of the collimator. The light sources may be turned on an off. The light sources may be selectively turned on and off. The light sources in each light bank may be individually turned on an off. Entire light banks may be turned on and off. Near light banks, intermediate light banks, far light banks, or a combination thereof may be turned on or off. The lights when on, may each illuminate a predetermined region. The lights when off may form one or more tunnels (e.g., dark spots). The lights when off may prevent glare of an adjacent vehicle, person, oncoming vehicle, house, road, or a combination thereof. The lights when off may create a dark spot around a location of interest (e.g., a tunnel).

The tunnel functions to create a dark spot, to prevent blinding or of an oncoming vehicle, to prevent glaring of other people or vehicles in an area, to reduce an amount of light directed towards another vehicle or individual, or a combination thereof. The tunnel may change size, shape, direction, intensity, or a combination thereof as the vehicle moves. The tunnel may be formed by turning off a single light. The tunnel may be formed by turning off one or more lights, two or more lights, three or more lights, or four or more lights. Preferably, two lights are turned off to form a tunnel. The tunnel may be formed by turning off only far lights, only intermediate lights, or only near lights. The tunnel may be formed by turning off far lights, intermediate lights, near lights, or a combination thereof. The tunnel may be formed by turning off two or more far lights, two or more intermediate lights, two or more near lights, or a combination thereof. The tunnel may have defined boundaries. The tunnels may not be entirely devoid of light (i.e., some overlap light may be present within the tunnel). The tunnels may be formed in line with a lamp axis, a reflector axis, or both. The tunnel may be located entirely on a side of a lamp axis, a reflector axis, or both. The tunnel may at least partially extend along a lap axis, a reflector axis, or both.

The lamp axis functions to be a center point of a light, a light source, a light bank, or a combination thereof. Each light may have a lamp axis. Preferably, each light bank includes a lamp axis (e.g., a center point of the light being directed from the light bank). The lamp axis may bisect a light bank. The lamp axis may be a center point of a light bank. The lamp axis extends along a direction of light extending away from the vehicle. The lamp axis may extend generally parallel to a reflector axis.

The reflector axis functions to be an axis of each reflector, each light source, or both. The reflector axis may extend from a center of a reflector. The reflector axis may bisect a reflector. The reflector axis may indicate a direction the light is reflected. The reflector axis may assist in aiming the light. Each reflector may include an individual reflector axis. The reflector axis may extend parallel to the lamp axis. The reflector axis may extend at an angle relative to the lamp axis. The reflector axis may extend at an angle of about 5 degrees or more, 10 degrees or more, 15 degrees or more, or 20 degrees or more relative to the lamp axis. The reflector axis may extend at an angle of about 60 degrees or less, about 45 degrees or less, 30 degrees or less, or 25 degrees or less relative to the lamp axis. When a light bank includes multiple reflectors (and reflector axes) the reflector axes may be equally spaced apart. When multiple reflector axes are present the reflector axes may be spaced apart by different angles. For example, two reflector axes may be separated by 25 degrees and two different axes may be separated by 30 degrees. The light bank may include reflector axes that symmetrically extend from a light bank. The lamp axis, the reflector axis, or both may extend parallel to the ground.

The lamp axis, the reflector axis, or both may extend towards the ground. Far lights may extend generally parallel to the ground (i.e., ±5 degrees). The far lights may extend at a larger angle than the intermediate lights and the near lights. The near lights may extends at an angle of about 60 degrees or less, about 45 degrees or less, about 30 degrees or less, about 25 degrees or more, about 15 degrees or more, or about 10 degrees or more. The far lights may have a face that extends about 90 degrees to the ground. The near lights may have a face that extends at an angle relative to the ground (e.g., 75 degrees or less, 60 degrees or less, 50 degrees or less, 45 degrees or more). A near light plane may extend parallel to the face of the near light.

The near light plane functions to show an angle between a face of the near lights and the ground. The near light plane demonstrates an angle different between the far lights and the near lights. The near light plane aims light from the light bank to a region proximate to the vehicle. The near light plane aims the light sources of the near lights relative to the far lights. The light sources may be connected to a sensor and a controller that control operation of the light sources, the periscope, or both.

The sensor functions to sense other vehicles, oncoming lights, people, objects, ground effects, items on a surface, or a combination thereof. The sensors may be located on a front, first side, second side, rear, a location therebetween, proximate to a light bank, under a light bank, on a top of a light bank, in a front of a light bank, or a combination thereof. The light system may include one or more sensors, two or more sensor, three or more sensors, or a same number of sensors and light banks. The sensor may selectively turn on or off some of the light sources when objects are sensed. The sensor may detect lights, movement, people, vehicles, or a combination thereof. The sensor may detect a predetermined darkness level and automatically turn the light system on. The sensor may detect a predetermined lightness level and automatically turn the lights off. The sensor may be remote from the light system. The sensor may communicate with the light system via a wire. The sensor may communicate with the light system wireless. The sensor and light system may be connected with near field communications, WIFI, Bluetooth, or a combination thereof. The sensor may be located on or within a cap of the periscope. The sensor may communicate with the controller and the controller may control the light system.

The controller functions to turn on, turn off, clean, raise, lower, selective turn on or off light sources, or a combination thereof the light system. The controller may be located within the light system. A portion of the controller may be located within the light system and a portion of the controller may be located remote from the light system. The controller may operate automatically based on predetermined conditions, based upon conditions sensed from the sensor, information from a user, or a combination thereof. For example, the user may have a remote that may control the light system. The controller may determine when the light system should turn off or on based upon information from the sensor. The controller may determine when the brightness or intensity of the lights have diminished and clean the lights or the light layer. The controller may control movement of the periscope up and down. The controller may control movement of the periscope so that the cap, light layer, and sleeve are moved. The controller, the light system or both may be secured to a platform to assist in moving the controller, the light system, or both. The controller may coordinate between each light bank, each light source, a sensor and the lights, or a combination thereof. The controller may turn off one or more lights. The controller may determine if an adequate tunnel is formed based on feedback from one or more sensors. The controller may dim a light, change orientation of a light, turn off far lights, leave near lights on, or a combination thereof. The controller may turn on and off the lights. The controller may control the light system wirelessly. The controller may control the light system via one or more wire harnesses.

The wire harnesses function to connect a controller and a sensor, a controller and light banks, or a combination thereof. The wire harness may carry data. The wire harness may carry power. The wire harnesses may assist in modulating power to the light sources so that the light sources are dimmable. The wire harnesses may provide information to a motor that changes orientation of the light banks. The controller may control a motor that positions or repositions a light bank. The motor may be held within a baffle and connected to the controller via the wire harness. The wire harness may extend along an outside of a vehicle. The wire harness may be included within a platform, a periscope, or both.

The periscope functions to provide light around a vehicle. The periscope functions to move between an open configuration and a closed configuration (e.g., cleaning configuration or a position where the light layer is protected). The periscope may be movable up and down relative to the platform. The periscope may elevate the light sources above the vehicle so that an area around the vehicle is lightened. The periscope may extend above the vehicle a distance of about 25 cm or more, about 50 cm or more, about 75 cm or more, or about 1 m or more (e.g., ±5 cm). The periscope may extend above the vehicle a distance of about 5 m or less, about 3 m or less, or about 2 m or less. The periscope may provide light 360 degrees around a vehicle. The periscope may provide light to a region substantially next to the vehicle and light to a region distal from the vehicle. For example, the periscope may provide light on ground that is about 20 feet away or less, about 15 feet away or less, or about 10 feet or less away from the vehicle (e.g., ±2 feet). The periscope may provide light on ground that is about 2 feet or more, about 5 feet or more, or about 7 feet or more away from the vehicle. The periscope may move along its own axis (e.g., up and down). The periscope may have one or more parts that nest within one another. The periscope may telescope to move up and down. The periscope may include a cap that creates a top and a base that creates a bottom.

The cap functions to create a lid on the top of the periscope. The cap function to enclose the light layer inside of the base when the periscope is in the closed configuration. The cap may prevent items from falling and damaging the light layer. The cap may assist in directing light from the light layer. The cap may include one or more reflective surface or be made of a reflective material. The cap may have a cross-sectional length (e.g., diameter) that is greater than the light layer, the sleeve, the base, or a combination thereof. The cap and the base may have substantially a same sized cross-sectional length (e.g., within 5 mm). The cap may be concave or have a concave connection with the light layer. The cap may extend downward towards the base. An outer periphery of the cap may contact the base when the periscope is in the closed configuration so that the insides (e.g., light layer) of the periscope is substantially enclosed and protected by the cap and the base. All or a portion of the cap may be complementary in shape to the base. When the cap is closed the cap and base may fit together to protect the contents between the cap and base, prevent dust and debris from entering, or both. The cap and base may be substantially sealed when in the closed configuration. The cap may have a peripheral edge that is complementary in shape to a peripheral edge of the base. For example, the base may have an edge that angled or chamfered and the cap may extend outward or downward with the same angle or chamfer. The cap may be located above, extend beyond, or both a light layer so that the light layer is protected by the cap.

The light layer may function to provide light to predetermined locations, to locations outside of the light system, around a vehicle, or a combination thereof. The light layer may project light in 360 degrees. The light layer may project light one or more distances, two or more distance, or three or more distances. The light layer may project light only one distance or only two distances. The light layer may provide one or more intensities, two or more intensities, or three or more intensities. The intensities and distances may be directly proportional. The light layer may be one large light source (e.g., similar to that of a light house). Preferably, the light layer is a plurality of light sources or light banks that provide light. The light layer may have portions that do not provide light. For example, the light layer may include connectors between the light banks or light sources that connect one light bank to an adjacent light bank. The light layer may be entirely transparent. The light layer may have regions or areas that may be opaque or may not transmit light. For example, connectors may be located between light banks and the connectors may not transmit light but the light banks may transmit light at such an angle that not dark spots may be present. The light layer may have a cross-sectional length that is smaller than a cross-sectional length of a sleeve so that all or a portion of the light layer may extend into the sleeve. The light layer may have one or more light banks. Preferably, the light layer includes a plurality of light banks and connectors.

The connectors function to connect two light banks together. The connectors function to create spacing between two adjacent light banks. The connectors may be substantially a same size as the light banks (e.g., an area of the connector may be substantially equal to an area as a light bank). A length of the connector and a length of the light bank may be substantially equal. The length of the connector may be sufficiently long so that two light banks may be located within the light layer without contacting one another.

The connectors may be rounded so that a circle may be formed. The connectors may be flat and may extend from a second edge of a first light bank to a first edge of a second light bank. The connectors may create spacing so that a rear end of the adjacent light banks do not contact one another. The connector and two adjacent light banks may form a triangular shaped void. The connector may be made of metal, plastic, a polymer, or a combination thereof. The connector may be opaque. The connector may be translucent. The connector may be reflective. The connector may have a reflective coating or film. The connector may be sheet of material. The connector and the housing of the light banks may be one continuous piece of material. The connector may include one or more ports.

The one or more ports may function to permit fluid to pass through the light layer. The one or more ports may function to assist in cleaning the light layer. The one or more ports may include a spray nozzle. The one or more ports may permit fluid to be sprayed outward towards the light banks so that the light banks are cleaned during operation. The one or more ports may positively move fluid around the light layer so that dirt, dust, debris, or a combination thereof are prevented from settling upon the light layer or the lens of the light banks. For example, the ports may continuously blow air across the lenses of the light layer so that airborne dust and debris are maintained airborne and are prevented from settling on the light banks. The ports may permit air, water, or both to be provided to the light banks for cleaning.

The sleeves may function to raise the light layer out of the base. The sleeves may be telescoping to raise the light layer. The light system may include one or more sleeves, two or more sleeves, three or more sleeves, four or more sleeves, eight or less sleeves, or ten or less sleeves. The sleeves may nest within one another, the base, or both. The sleeves my determine a height the light layer is raised above the vehicle. Each of the sleeves may have a height substantially equal to a height of the base so that when the light system is in the closed configuration the sleeves and light layer are located between and covered by the cap and base. The sleeves may slide axially to raise and lower the light layer and the cap. The sleeves may be locked in a raised position (e.g., open configuration) the lowered position (e.g., closed configuration), or both. The sleeves may lift the light layer out of the base.

The base functions to house all of the components of the periscope, support the periscope, or both. The base functions to protect the components when the light system is in a stored configuration. The base may include all of the controls, electronics, controllers, sensors, motors, or a combination thereof. The base may include all or a portion of a cleaning system. The base may enclose all of the components so that the light system is transportable. The base may protect the components (e.g., light layer, sleeves) from damage, dust, debris, or a combination thereof. The base may be connected to a platform or directly connected to a vehicle. The base may be solid or may include one or more cavities.

The cavities may function to store electrical elements, all or portion of a cleaning system, a lifting device, fluid, motors, pump, or a combination thereof. The cavities function to create a space radially outward of the sleeves or between the sleeves and an inside of an outer surface of the base. A fluid may circulate or be recirculated within the cavities. For example, a fluid may be passed over the light layer and collected within the cavities and then cleaned so that the fluid may be reused. The cavities may be a single cavity that forms a ring around the sleeve. The cavities may be a plurality of compartments that include different components of the light system. For example, a motor or lifting device may be located within one cavity and a fluid may be located within a different cavity. The cavity may receive a rear side of the locks.

The locks function to connect the cap to the base when the light system is in the closed configuration, move nozzles into a stored position, or both. The locks may prevent the periscope from opening during transportation. The locks may prevent the light layer from being damaged when the light system is not in use. When the locks are in use the light system may be substantially sealed from fluid, debris, dust, or a combination thereof. The locks may automatically bias closed when the cap contacts the locks. The locks may release the cap when the controller actuates the locks. The locks all may lock and release simultaneously. The locks may be connected in parallel so that when one lock is actuated all of the locks are actuated. The locks may be controlled by a cord, wire, string, actuator, or a combination thereof. The locks may be actuated or released by the lifting device or when the lifting device is actuated.

The lifting device functions to move the light layer axially away from the vehicle. The lifting device function to elevate the light layer so the light can be provided unobstructed from the light system. The lifting device may telescope the sleeves and the light layer. The lifting device may operate pneumatically, hydrologically, mechanically, or a combination thereof. The lifting device may have a cylinder that when pumped with a fluid pushes against the cap and base and lifts the light layer. The lifting device may be a stepper motor. The lifting device may be one or more gears that lift the sleeve and light layer. The lifting device may be located on a side of the sleeve, near the base, in a center of the base, create a force between the cap and the base that lifts, or a combination thereof. The lifting device may move the periscope between the open configuration and the closed configuration.

In the open configuration the light layer functions to provide light around a vehicle. In the open configuration the light layer may be raised above the vehicle. In the open configuration the light layer and sleeves may be telescoped. In the open configuration the light layer may be cleaned. In the open configuration the light layer may be exposed to the elements. The periscope may be moved from an open configuration to a closed configuration to protect the light layer when not in use.

In the closed configuration the cap and base may be located proximate to one another, surround the light layer and sleeve, or both. In the closed configuration the sleeves and light layer may be nested within the base. In the closed configuration the cap may be locked to the base. In the closed configuration the light layer may be cleaned. In the closed configuration, the light layer may be protected against UV light. The light system may be transported, installed, or both when the light system is in the closed configuration. The light system may be moved via a platform when the light system is in a closed configuration.

The platform may function as a support surface for the light system or the periscope. The platform may be connected to a vehicle and then the periscope connected to the platform. The platform may be permanently connected and the periscope moved from platform to platform. The platform may support the periscope during movement. The platform may include electrical connections, fluid connections, sensor connections or a combination thereof. The platform may be electrically connected to the vehicle so that when the periscope is added to the platform the periscope may be quickly and easily be connected to the vehicle's electrical system. The platform may include power, fluid, motors, or a combination thereof. The platform may only be a rigid material that connects to the vehicle. The platform may be a flat surface. The platform may assist in leveling the periscope. The platform may connect to structural components (e.g., an a-pillar, b-pillar) of the vehicle to create a layer above a roof of the vehicle. The platform may create a roof above the roof so that there is no contact with actual roof. The platform may be an elevated rack that supports the periscope. The platform may support the periscope and external parts of a cleaning system.

The cleaning system functions to remove dirt, debris, or any other contaminants from the light layer so that light from the light layer lights regions surrounding the vehicle. The cleaning system may run continuously. The cleaning system may run intermittently. The cleaning system may use air. The cleaning system may use water. The cleaning system may mechanically clean. The cleaning system may include one or more sensors that sense an intensity of light exiting the light layer. The cleaning system may be free of fluid usage. The cleaning system may only operate when the periscope is in the closed configuration. The cleaning system may only use water when the periscope is in the closed configuration. The cleaning system may only clean when the periscope is in the open configuration. The cleaning system may include one or more nozzles.

The nozzles function to remove material that inhibits light from extending out from the light layer. The nozzles may function to prevent materials from collecting on the light layer. The nozzles may distribute a fluid. The nozzles may direct a fluid across each of the lenses (e.g., outer layer) of each light bank. The nozzles may blow air across or around the light banks to create turbulence for airborne particles. The nozzles may blow air, a fluid, water, or a combination thereof at a pressure of 300 kPa or more, 500 kPa or more or even about 750 kPa or more. The nozzles may blow air, a fluid, water, or a combination thereof at a pressure of about 2000 kPa or less, about 1500 kPa or less, or about 1000 kPa or less. The nozzles may blow a fluid substantially 360 degrees around the nozzles. The nozzles may be located in the base. The nozzles may be part of a lock. The nozzles and locks may be alternatively located around the base, the light system, or both. The nozzles may be part of the lock so that when the periscope moves into a closed configuration that nozzles are stored and protected. The nozzles may only blow a fluid to the sides to direct the fluid across the faces of the light banks. The nozzles may create turbulence in the fluid when the fluid is moved. The nozzles may direct water, air, a liquid with chemicals, or a combination thereof.

The fluid functions to clean the light sources, the lenses, or both. The fluid functions to prevent dirt and debris from collecting on the light sources, lenses, or both. The fluid may be water. The fluid may be water with a chemical (e.g., a surfactant). The fluid may be a foam. The fluid may be air. The fluid may be stored, pressurized, recycled, or a combination thereof. The fluid may be stored in or distributed by a fluid distributor, a fluid reservoir, or both The fluid distributor, fluid reservoir, or both (hereinafter fluid distributor) functions to store fluid, store compressed fluid, clean the fluid, or a combination thereof. The fluid distributor may hold a volume of fluid. The fluid distributor may hold a predetermined amount of fluid. The fluid distributor may hold a sufficient amount of fluid so that the fluid distributor only has to be refilled once a day or once a shift. The fluid distributor may include a pump or compressor. The fluid distributor may be a tank including a plurality of holes.

The fluid distributor may distribute fluid to one or more fluid lines. Preferably, the fluid distributor distributes fluid to a plurality of fluid lines.

The fluid lines may provide fluid across the lenses, the light banks, or both. The fluid lines may circulate the fluid intermittently or continuously. The fluid lines may provide the fluid to the ports, a nozzle, or both. The fluid lines may expand and contract. The fluid lines may be movable with the light layer, the sleeves, or both. The fluid lines may be made of rubber. The fluid lines may be made of braded metal or plastic. The fluid lines may hold a fluid with the pressure taught herein. The fluid lines may extend 360 degrees around the periscope. The fluid lines may extend on one or more layers or regions of the periscope. The fluid lines may in addition to a mechanical cleaning device.

The mechanical cleaning device functions to remove dirt, debris, items that inhibit light from illuminating region around a vehicle, or a combination thereof. The mechanical cleaning device may be passive. For example, the mechanical cleaning device may sit in one location and the light layer may move up and down or rotate to remove the dirt, debris, items that inhibit light, or a combination thereof. The mechanical cleaning device may move up and down, rotate, or both. The mechanical cleaning device may be used in addition to fluid. The mechanical cleaning device may include a brush or bristles. The brush may be a sponge a paper with grit. The mechanical cleaning device may agitate the light layer while a fluid is being applied. The mechanical cleaning device may move over the light layer to loosen the dirt and debris. The mechanical cleaning device may work intermittently upon a sensed cleanliness or lack of cleanliness. The mechanical cleaning device may be sufficiently rigid to loosen or remove dirt and debris. The mechanical cleaning device may be sufficiently soft that the lenses, light bank, or both are not scratched or damaged. The mechanical cleaning device may move up and down the light layer, rotate around the light layer, or both.

The light system, mechanical cleaning device, or both may be operated by a method. The method may include moving the light system along a longitudinal axis. Spraying a fluid on the light source. Mechanically cleaning the light source. Refilling a cavity with a fluid. Spraying water on the light layer. Running water across the light layer. Cleaning the light layer in a closed configuration, an open configuration, or both. Blowing air across the light layer. Cycling the light layer between an open configuration and a closed configuration. Rotating the light layer about a rotational axis. The cleaning system may run continuously, intermittently, upon a sensed condition, upon an amount of sensed light being reduced (relative to a clean light), or a combination thereof. The cap may be located to the base. The cap, light layer, or both may be raised a distance of one or more sleeves, two or more selves, or three or more sleeves. A brush may be raised across the light layer to mechanically clean. The brush may remove water, debris, or both. The brush may act as a squeegee.

FIG. 1A illustrates a top view of a vehicle 2 including a light system 10. The light system 10 includes a plurality of light sources 12 and a sensor 24 so that as the sensor 24 senses oncoming light some of the light sources 12 are turned on and off.

Figure 1B:
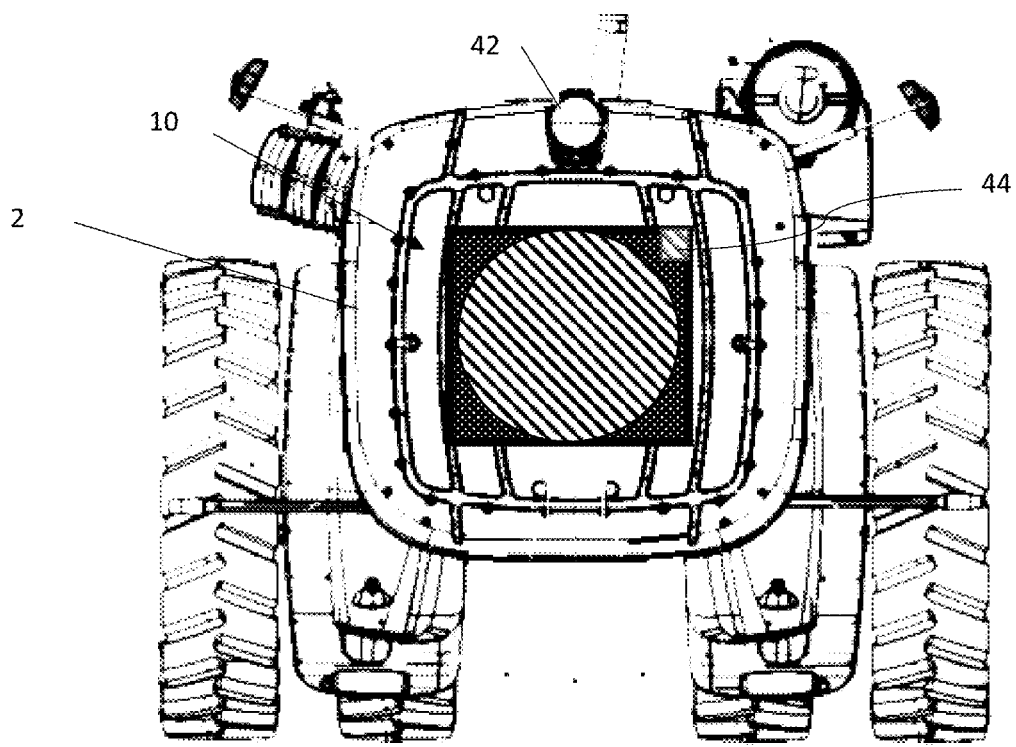
FIG. 1B is a top view of a vehicle including the light system.

FIG. 1B illustrates a top view of a vehicle 2 including a light system 10. The light system 10 includes a plurality of light sources and a sensor 42 so that as the sensor 42 senses oncoming light some of the light sources are turned on and off. The sensor 42 is in communication with a controller 44 that controls the light sources and movement of the light system.

Figure 2:
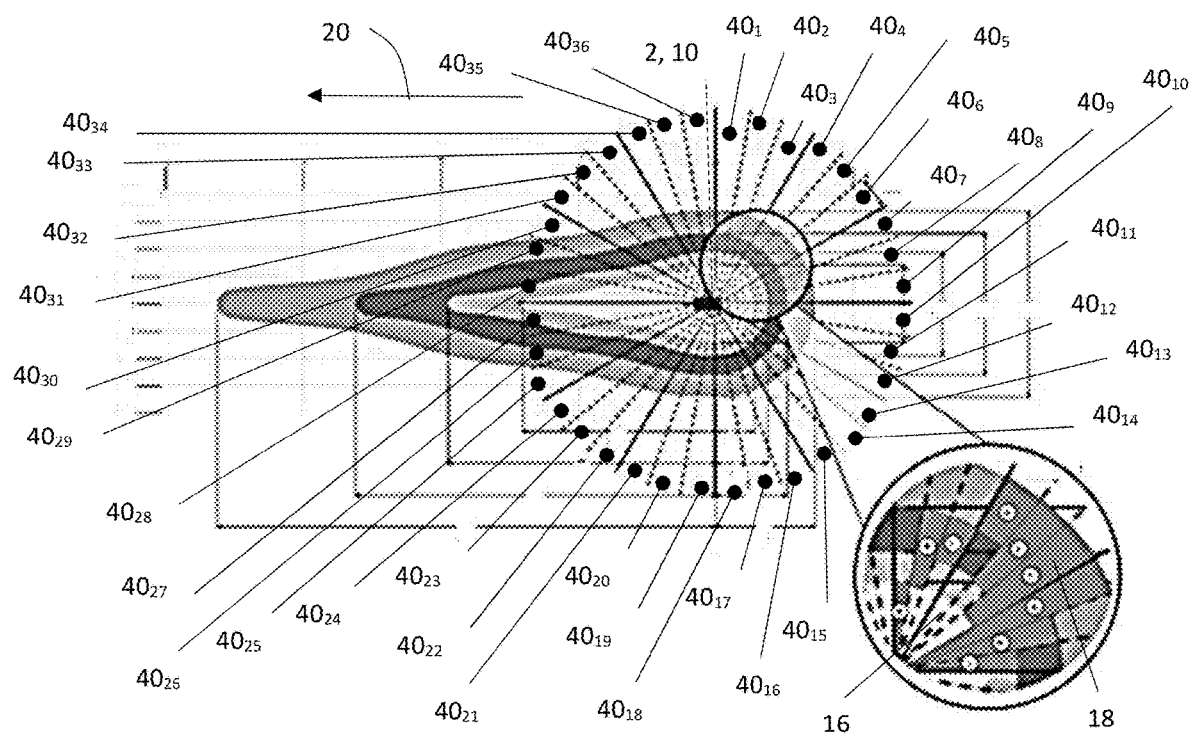
FIG. 2 is a top view of light segments created by the light system with a close up on different regions within each segment.

FIG. 2 is a top view of light segments 40 formed by the light system 10 around a vehicle 2. The light system 10 is divided into a plurality of segments 40. As shown, the light system 10 is broken into 36 segments that are labeled $40_1$ as the first light segment and $40_{36}$ being the last light segment with light segments $40_2$-$40_{35}$ being located therebetween. FIG. 2 also has a close-up view of some of the segments 40 and a near region 16 and far region 18 within the segments.

Figure 3:
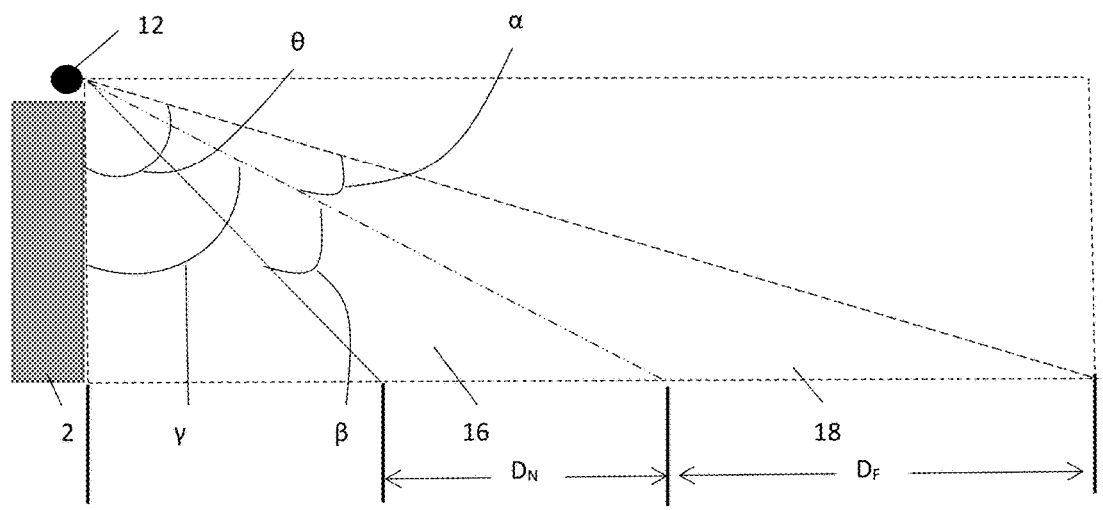
FIG. 3 illustrates the light system providing both near light and far light.

FIG. 3 illustrates a light pattern formed by a light source 12 on a vehicle 2. The light source 12 with a near light 16 and a far light 18. The near light 16 transmit light that forms an angle ($\beta$) and extends an angle ($\gamma$) from the vehicle so that the near light 16 lights a region ($D_N$). The far light 18 transmits light that forms an angle ($\alpha$) and extends at an angle ($\theta$) from the vehicle 2 so that the far light 18 lights a region ($D_F$).

Figure 4A:
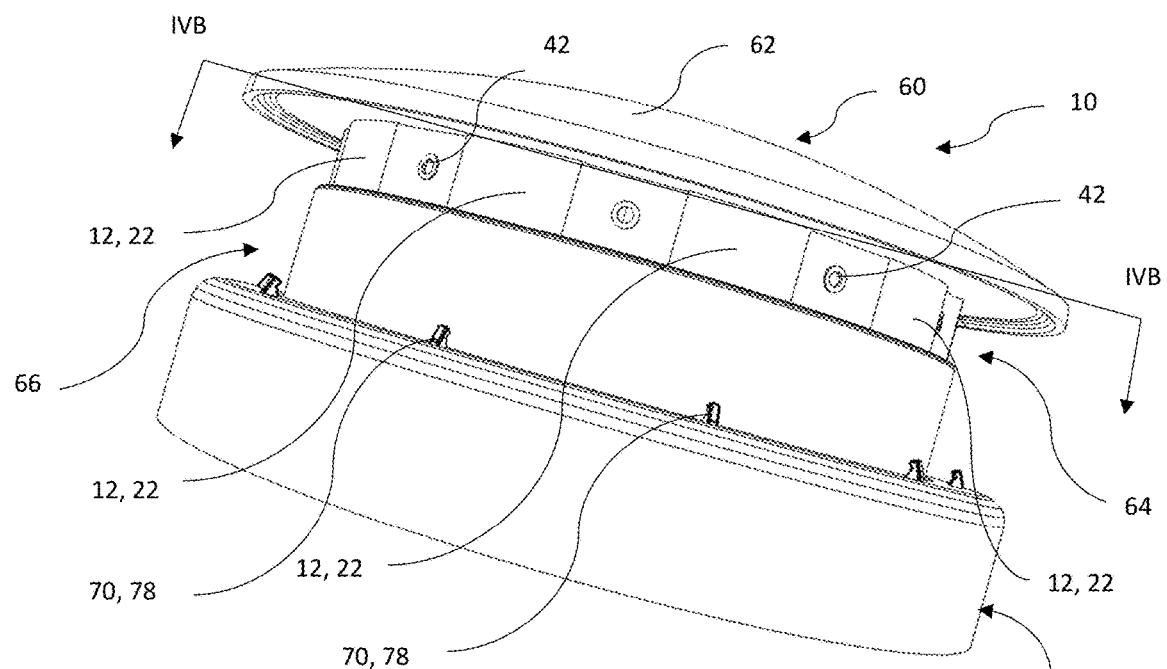
FIG. 4A is a perspective view of a light system.

FIG. 4A is a perspective view of a light system 2. The light system 2 is a periscope 60. The periscope 60 includes a cap 62, a light layer 64, a sleeve 66, and a base 68. The light layer 64 includes sensors 42 that sense surroundings such as other vehicles, lights, or people. The light layer 64 includes a plurality of light sources 12 in a light bank 22. The base 70 includes a plurality of locks 70 around the periscope 60 for locking the cap 62 in a closed position. The plurality of locks 70 may also include nozzles that spray a fluid on or towards the light bank 22 to clean the light system 10.

Figure 4B:
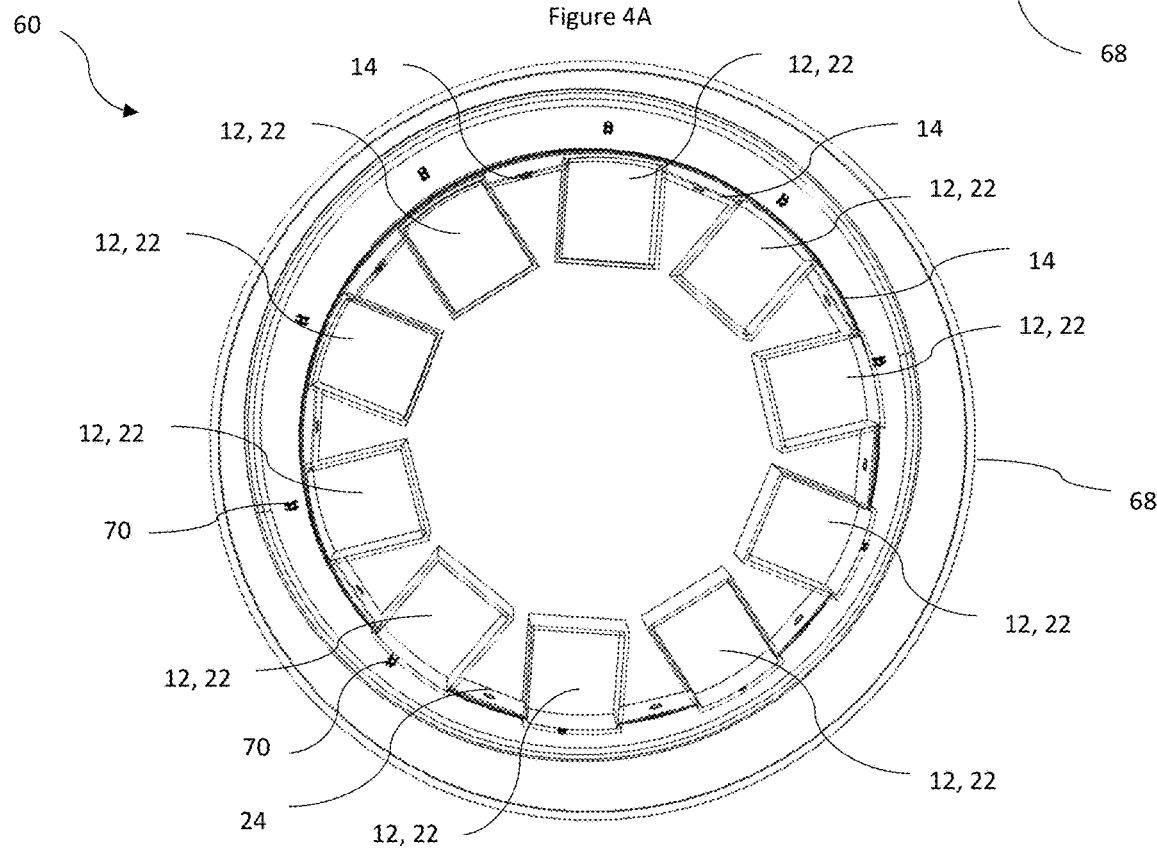
FIG. 4B is a cross-sectional view of the light system of FIG. 3 along lines IV-IV.

FIG. 4B is a cross-sectional view of a base 68 of a periscope 60 of FIG. 4A. The base 68 includes a plurality of light banks 22 spaced apart by a plurality of connectors 14. Each of the light banks 22 include a plurality of light sources 12 that direct light 360 around a vehicle (not shown). The connectors 14 include ports 24 that allow for fluid to pass around an outside of the light banks 22.

Figure 5:
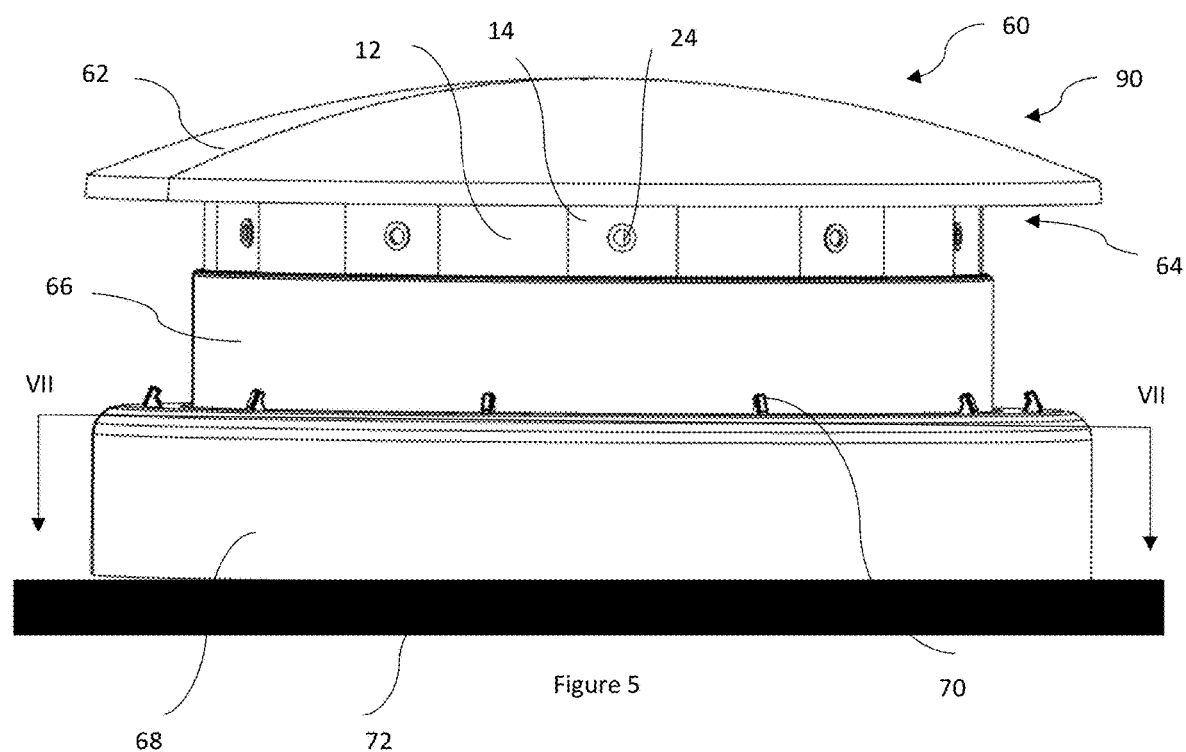
FIG. 5 is a front view of a light system in an open configuration.

FIG. 5 is a plan view of the periscope 60 in an open configuration 90. As shown, a cap 60 extends above a light layer 64 that has light sources 12 with connectors 14 located between the light sources 12. The connectors 14 include ports 24 that extend therethrough. A sleeve 66 is located below the light layer 64 so that when the periscope 60 moves from the open configuration to the closed configuration, the light layer 64 slides into the sleeve 66 and the base 68. The base 68 includes a plurality of locks 70 that connect to the cap 62. The periscope 60 is located on a platform 72 that assists in moving the periscope 60 or connecting the periscope 60 to a vehicle (not shown).

Figure 6:
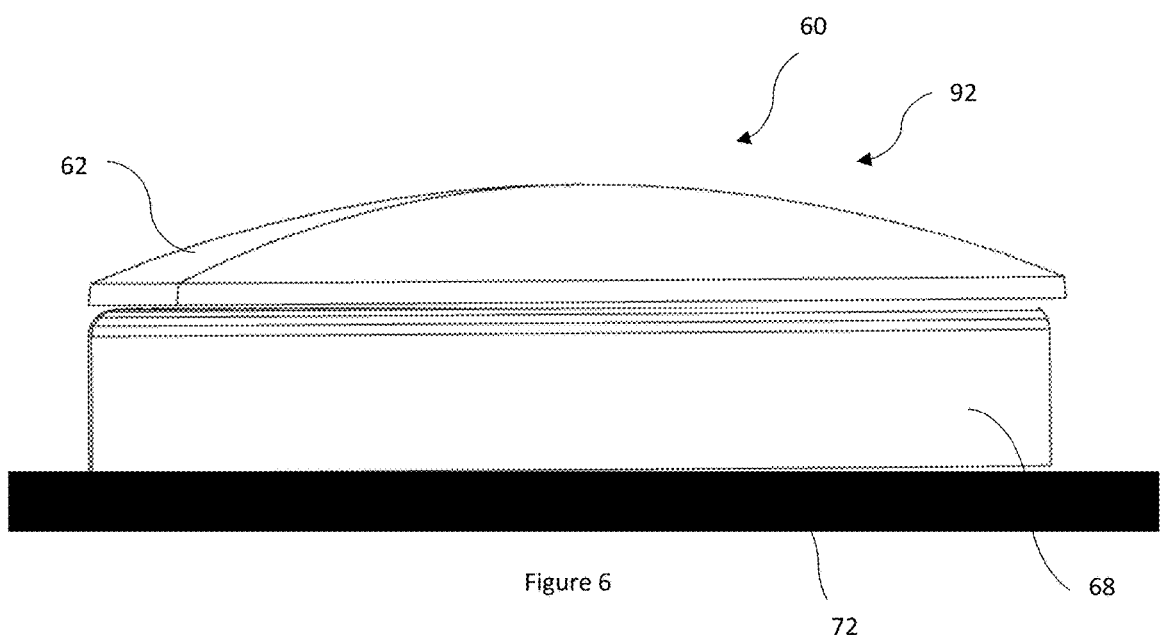
FIG. 6 is a front view of a light system in a closed configuration or a cleaning configuration.

FIG. 6 is a plan view of the periscope 60 in the closed configuration or cleaning configuration 92. In the closed configuration or cleaning configuration 92 the cap 62 is lowered onto the base 68. The light layer (not shown) is nested into the sleeve (not shown) and the sleeve is nested into the base 68. The cap 62 can be located onto the base 68 by the locks (not shown). As shown, the periscope 60 sits upon a platform 72.

Figure 7:
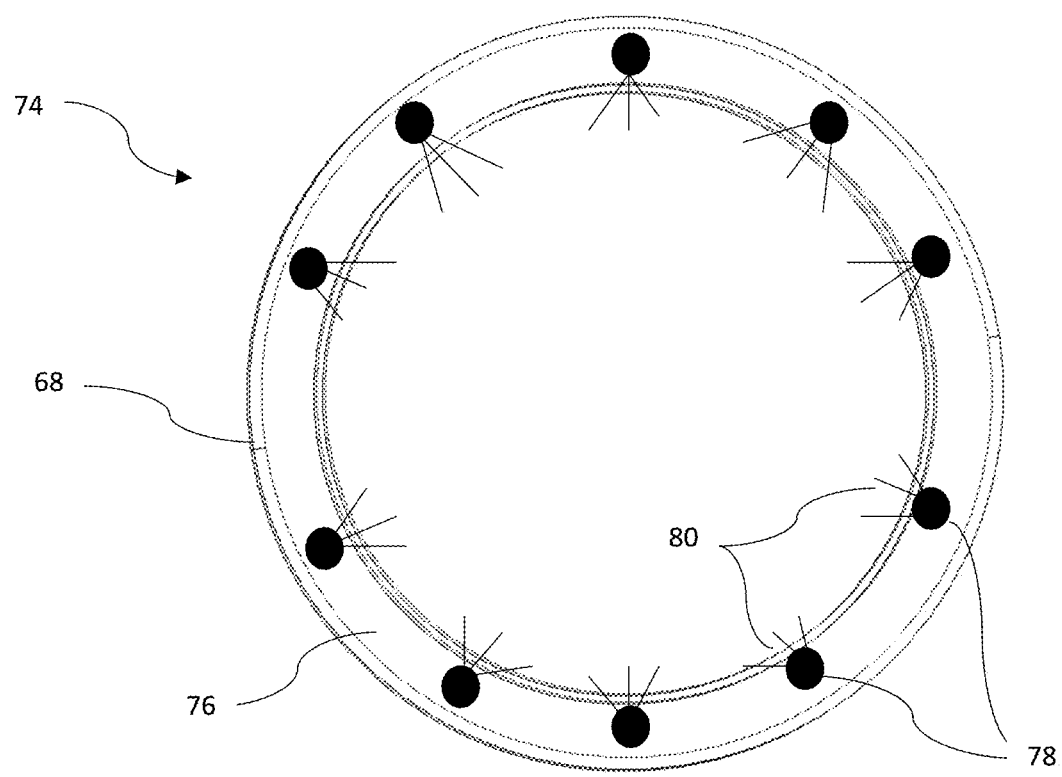
FIG. 7 shows a cleaning system.

FIG. 7 is a top view of a cleaning system 74 located within a cavity 76 within the base 68. The cavity 76 holds all or a portion of a plurality of nozzles 78 that align with the lights (not shown) when the lights are in the closed configuration or the cleaning configuration (not shown) or the open configuration. Each of the nozzles 78 are aligned with a light so that fluid 80 is directed towards each light to clean the light. The nozzles 78 may be actuated to extend above the base 68 when in the cleaning configuration or be located at an internal location (e.g., inside the cavity 78) to clean.

Figure 8:
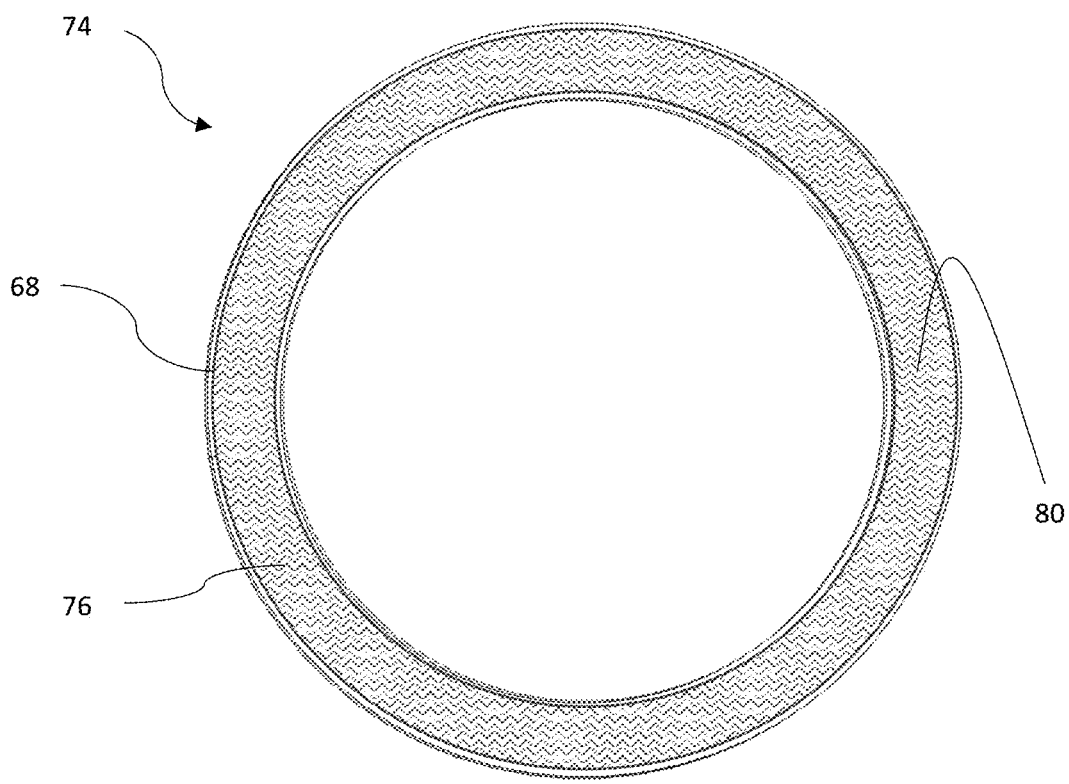
FIG. 8 shows a cleaning system.

FIG. 8 is a top view of a cleaning system 74 located within a cavity 76 of the base 68. The cavity 76 is filled with fluid 80 that is stored within the cavity 76 so that the fluid can clean the light sources (not shown).

Figure 9:
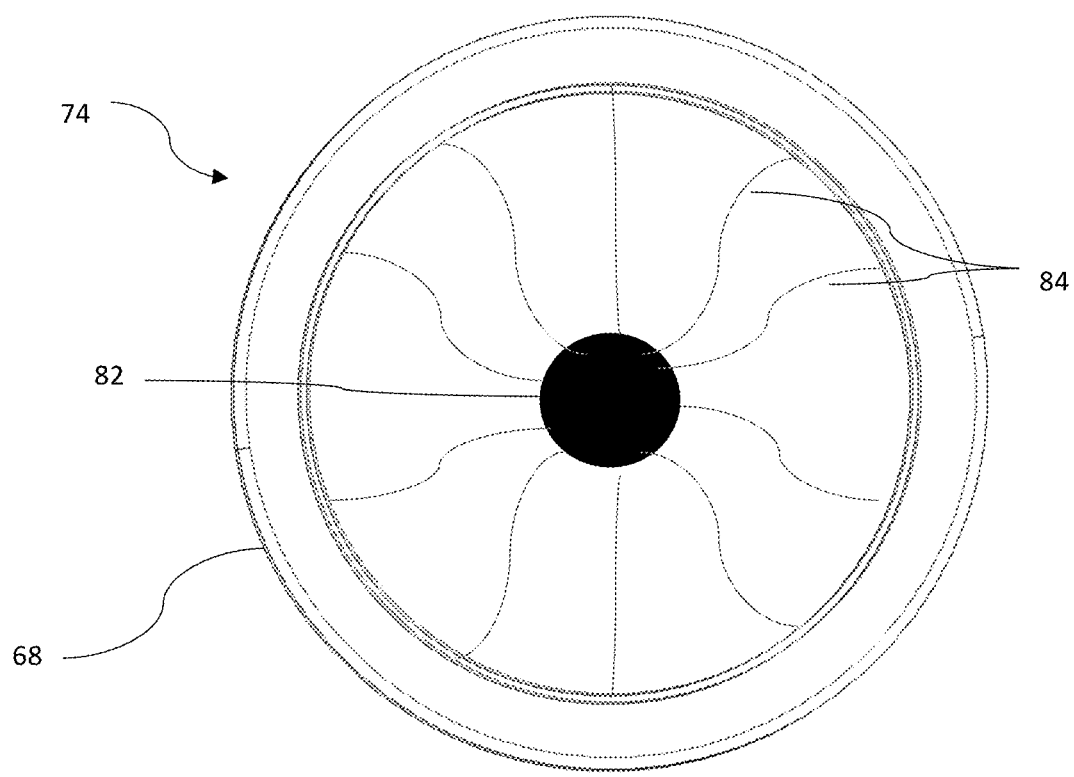
FIG. 9 shows a cleaning system.

FIG. 9 is a top view of a cleaning system 74. The cleaning system 74 includes a fluid distributor 82 that may also be a fluid reservoir to store fluid. A plurality of fluid lines 84 extend between the fluid distributor 82 and the base 68 or the ports in the light layer (not shown) so that fluid is distributed to clean the light sources (not shown) within the light system.

Figure 10:
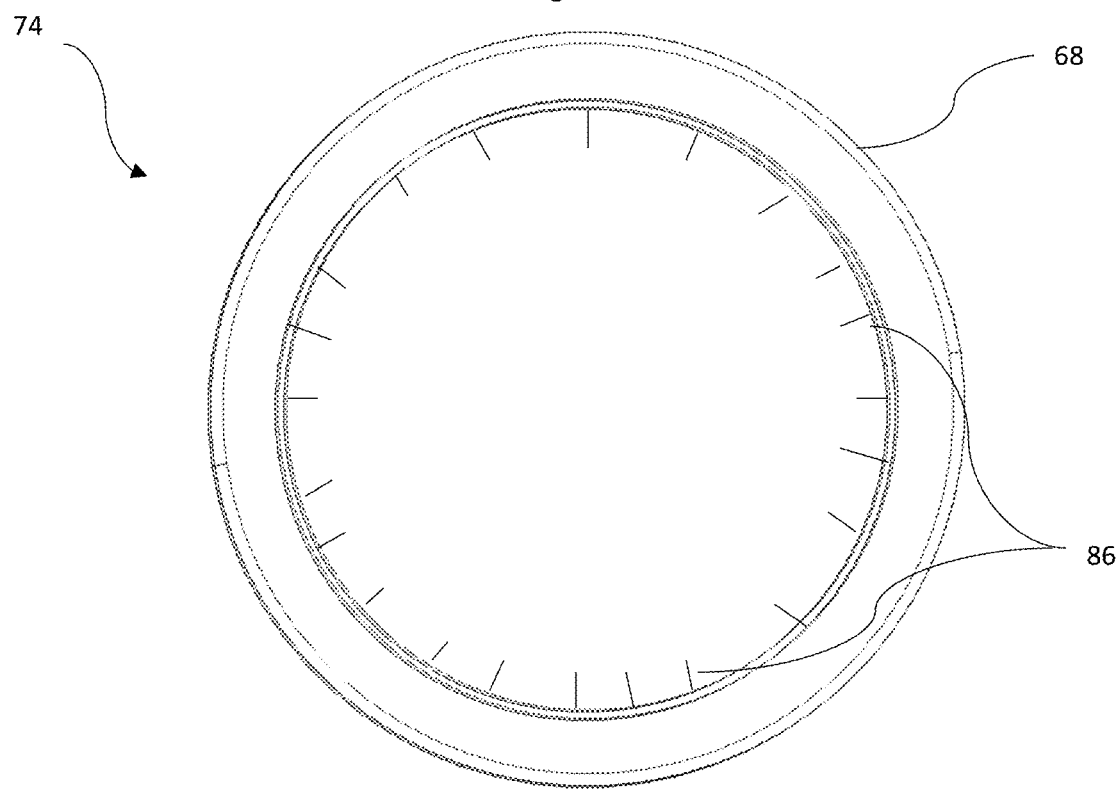
FIG. 10 shows a cleaning system.

FIG. 10 is a top view of a cleaning system 74. The cleaning system 74 includes a plurality of brushes 86 extending around an inside of the base 68.

Figure 11:
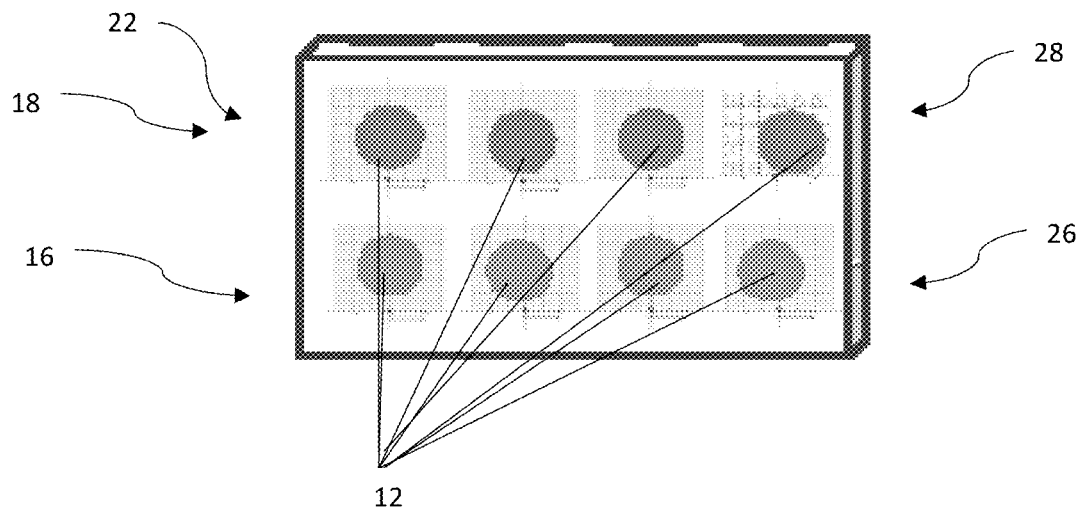
FIG. 11 is a front view of a light bank.

FIG. 11 is a light bank 22 having a plurality of light sources 12. The light sources 12 are divided into a near region 16 having a plurality of near lights 26 that project light a first distance and a far region 18 having a plurality of far lights 28 that project light a second distance that is greater than the first distance.

Figure 12:
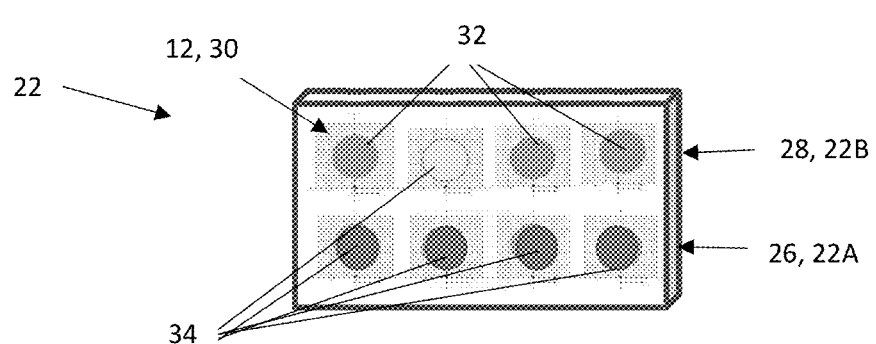

FIG. 12 illustrates a light bank 22 including a light source 12 and reflector 30 for each of the lights. The light bank 22 has a far light bank 22A with a plurality of far lights 28 and a near light bank 22B with a plurality of near lights 26. The near lights 26 are all off 34 and the far lights 28 have three on 32 and one off 34.

Figures 13A, 13B:
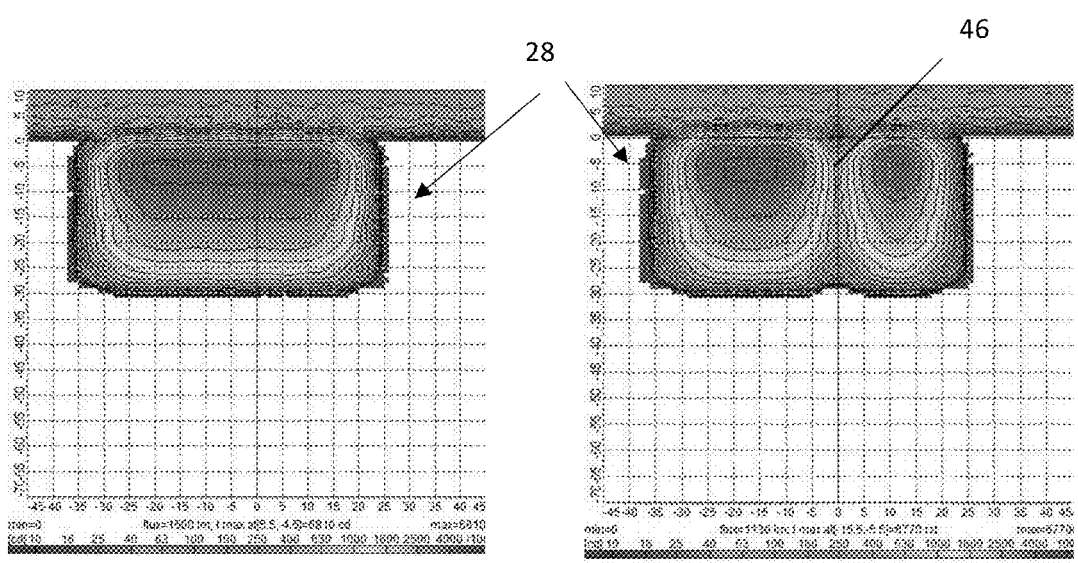
FIG. 13A illustrates a light pattern of the light bank with all of the far lights on and all of the near lights off.
FIG. 13B illustrates a light pattern corresponding with the light bank of FIG. 12.

FIG. 13A is a top view of the light pattern of far lights 28.

FIG. 13B is a top view of the light pattern of the far lights 28 of FIG. 12 forming a tunnel 46.

Figure 14:
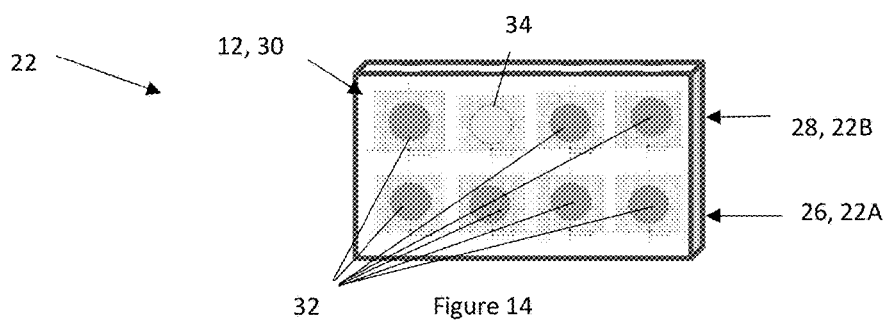

FIG. 14 illustrates a light bank 22 including a light source 12 and reflector 30 for each of the lights. The light bank 22 has a far light bank 22B with a plurality of far lights 28 and a near light bank 22A with a plurality of near lights 26. The near lights 26 are all on 32 and the far lights 28 have three on 22 and one off 34.

Figure 15A:
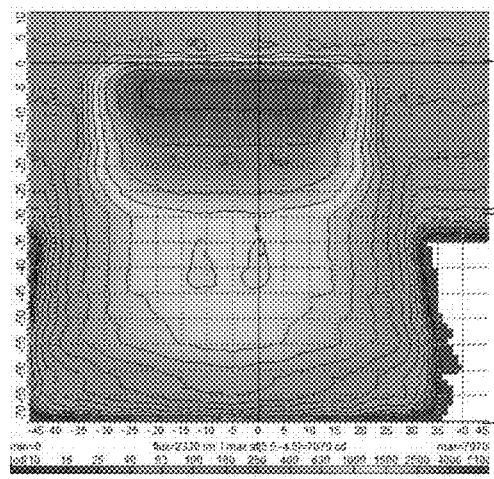

FIG. 15A is a top view of the light pattern of far lights 28 and near lights 26.

Figure 15B:
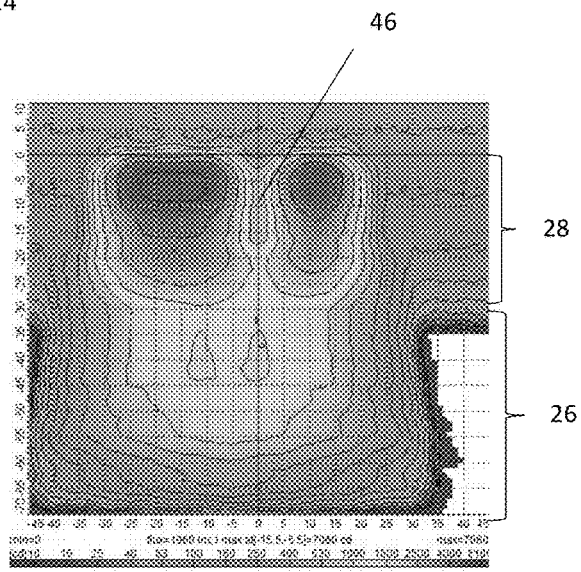
FIG. 15B illustrates a light pattern corresponding with the light bank of FIG. 14.

FIG. 15B is a top view of the light pattern of the far lights 28 and near lights 26 of FIG. 14 forming a tunnel 42.

Figure 16A:
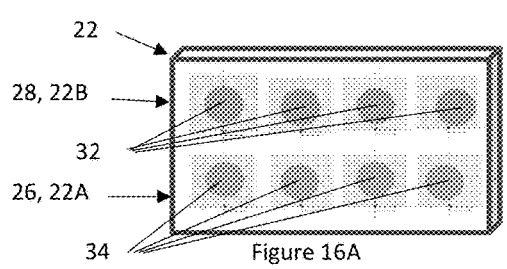
FIG. 16A is a light bank including all of the far lights on and all of the near lights off.

FIG. 16A illustrates a light bank 22 including a far light bank 22B with a plurality of far lights 28 and a near light bank 22A with a plurality of near lights 26. The near lights 26 are all off 34 and the far lights 28 all on 32.

Figure 16B:
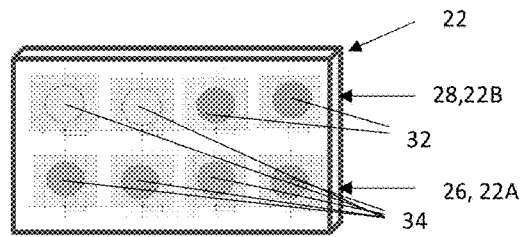
FIG. 16B is a light bank including two of the far lights on and two off and all of the near lights off.

FIG. 16B illustrates a light bank 22 including a far light bank 22B with a plurality of far lights 28 and a near light bank 22A with a plurality of near lights 26. The near lights 26 are all off 34 and the far lights 28 have two on 32 and two off 34.

Figure 17A:
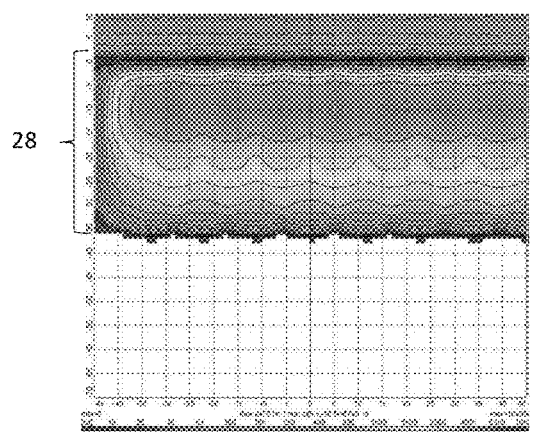
FIG. 17A illustrates a light pattern corresponding with the light bank of FIG. 16A.

FIG. 17A is a top view of the light pattern of far lights 28 of FIG. 16A.

Figure 17B:
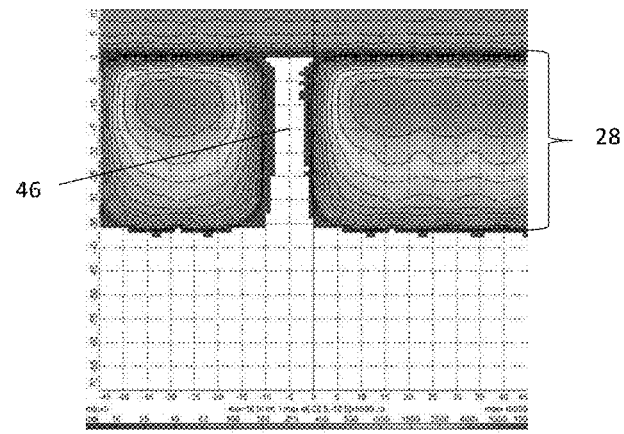
FIG. 17B illustrates a light pattern corresponding with the light bank of FIG. 16B.

FIG. 17B is a top view of the light pattern of the far lights 28 of FIG. 16B forming a tunnel 46.

Figure 18A:
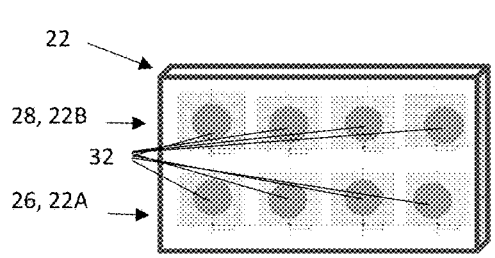

FIG. 18A illustrates a light bank 22 including a far light bank 22B with a plurality of far lights 28 and a near light bank 22A with a plurality of near lights 26. The near lights 26 are all on 32 and the far lights 28 all on 32.

Figure 18B:
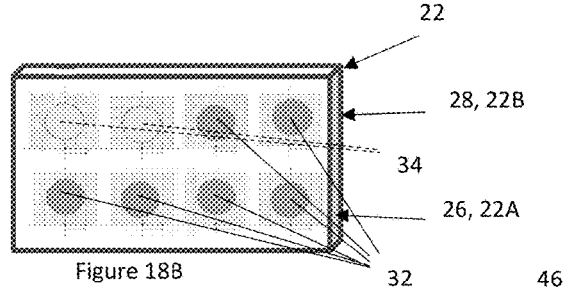

FIG. 18B illustrates a light bank 22 including a far light bank 22B with a plurality of far lights 28 and a near light bank 22A with a plurality of near lights 26. The near lights 26 are all on 32 and the far lights 28 have two on 32 and two off 34.

Figure 19A:
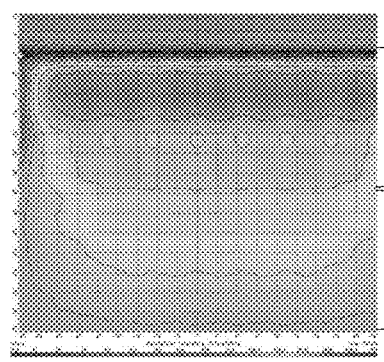
FIG. 19A illustrates a light pattern corresponding with the light bank of FIG. 18A.

FIG. 19A is a top view of the light pattern of far lights 28 and near lights 26 of FIG. 18A.

Figure 19B:
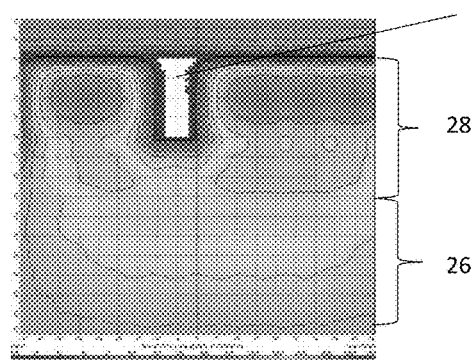
FIG. 19B illustrates a light pattern corresponding with the light bank of FIG. 18B.

FIG. 19B is a top view of the light pattern of the far lights 28 and near lights 26 of FIG. 18B forming a tunnel 46.

Figure 20:
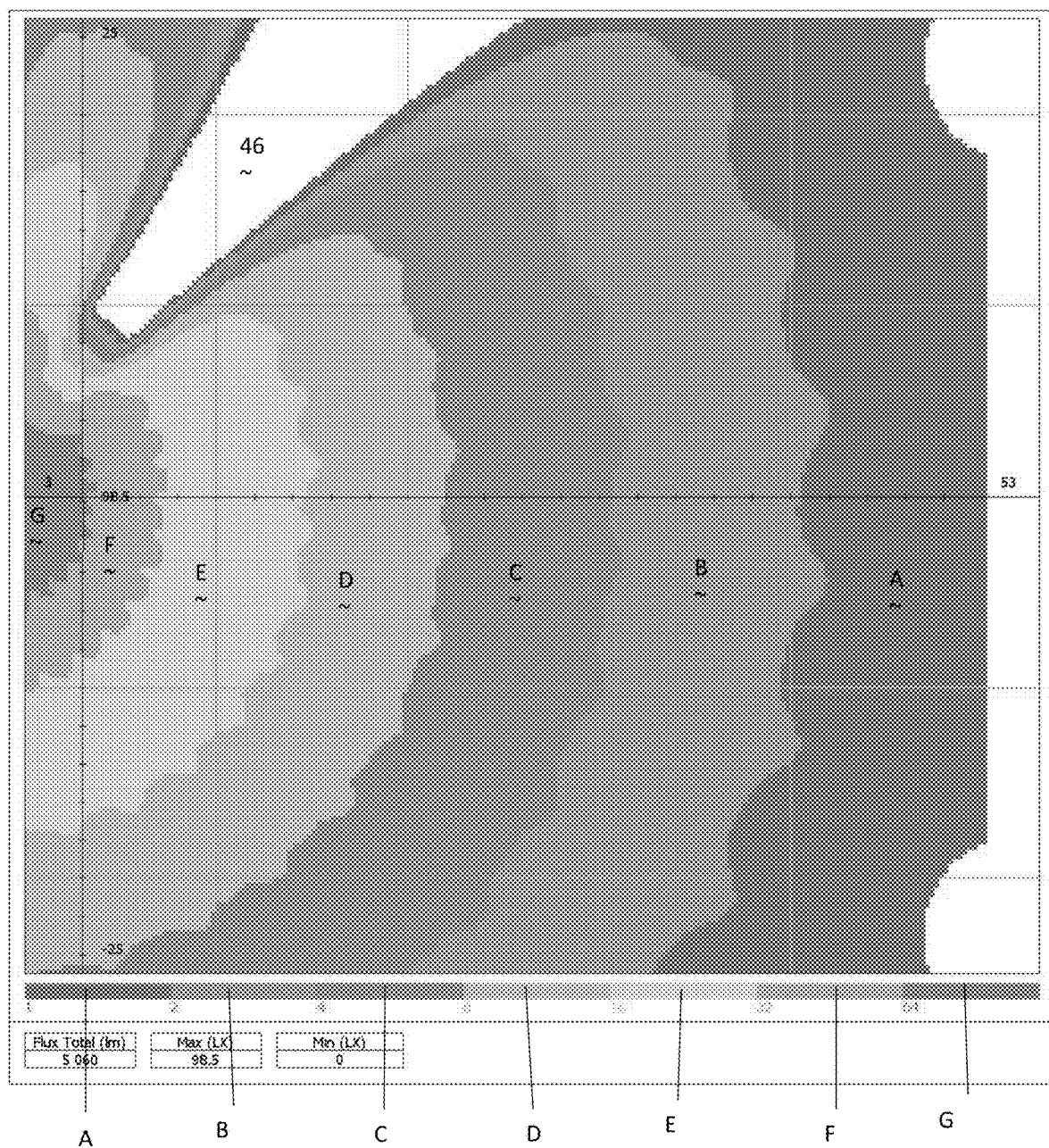
FIG. 20 illustrates a light pattern and intensity level of the light around the light pattern.

FIG. 20 is a light pattern and intensity level having intensities A, B, C, D, E, F, and G. The light pattern includes a tunnel 46.

Figure 21:
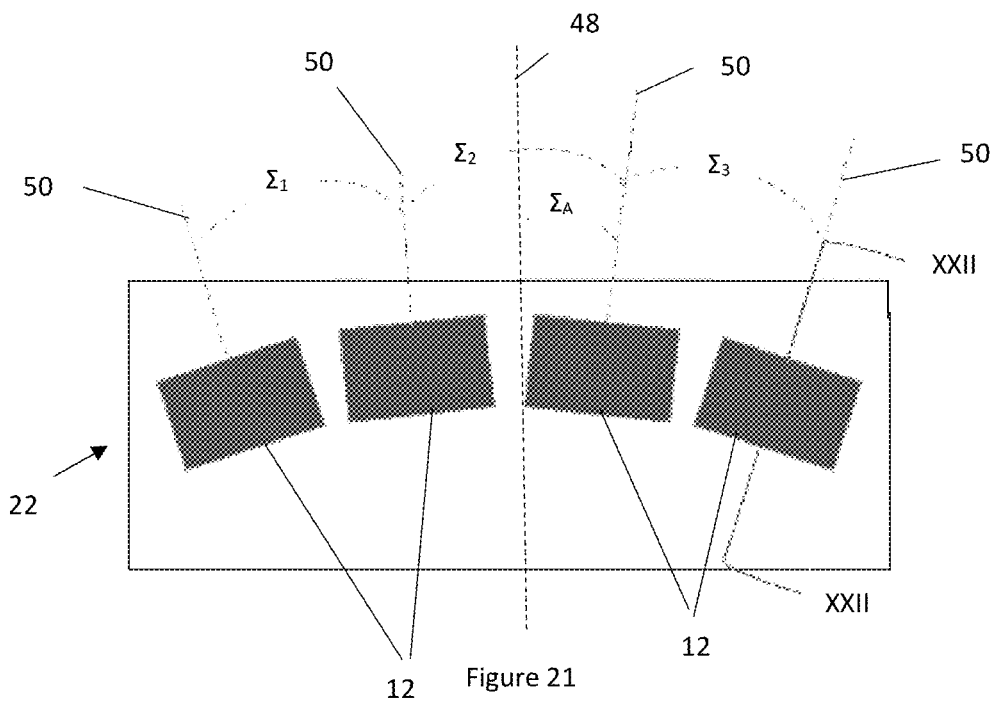
FIG. 21 is a top view of a light bank including multiple near lights and multiple far lights.

FIG. 21 illustrates a top view of a light bank 22. As shown the light bank 22 includes a plurality of light sources 12 (as shown there are 4). The light sources 12 are spaced apart by an angle ($\Sigma_1$), ($\Sigma_2$), and ($\Sigma_3$) respectively. The angles as shown are measured between reflector axes 50. A lamp axis 48 extends through a center of the light bank 22. The lamp axis 448 is located an angle ($\Sigma_A$) apart from the reflector axis 48.

Figure 22:
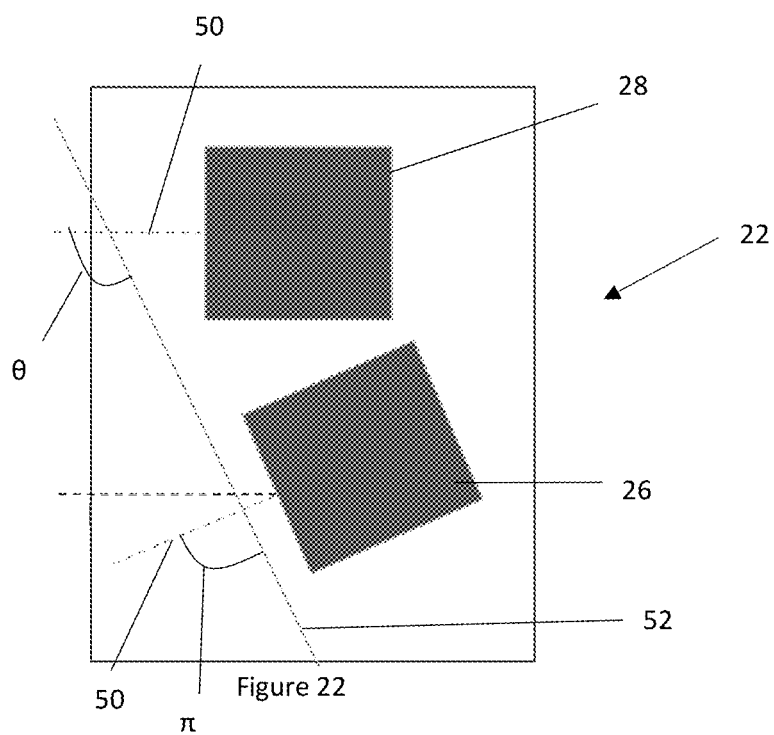
FIG. 22 is a cross-sectional view of the light bank of FIG. 21.

FIG. 22 is a cross-sectional view of the light bank 22 of FIG. 21 along lines XXII-XXII. The light bank 22 includes a near light 26 and a far light 28. As shown, a near light plane 52 extends parallel to a face of a near light 26. The near light 26 has light that extends outward in a direction 50 at an angle ($\pi$) relative to the near light plane 52. The far light 28 has light that extends outward at an angle ($\theta$) relative to the near light plane 52.

Figure 23:
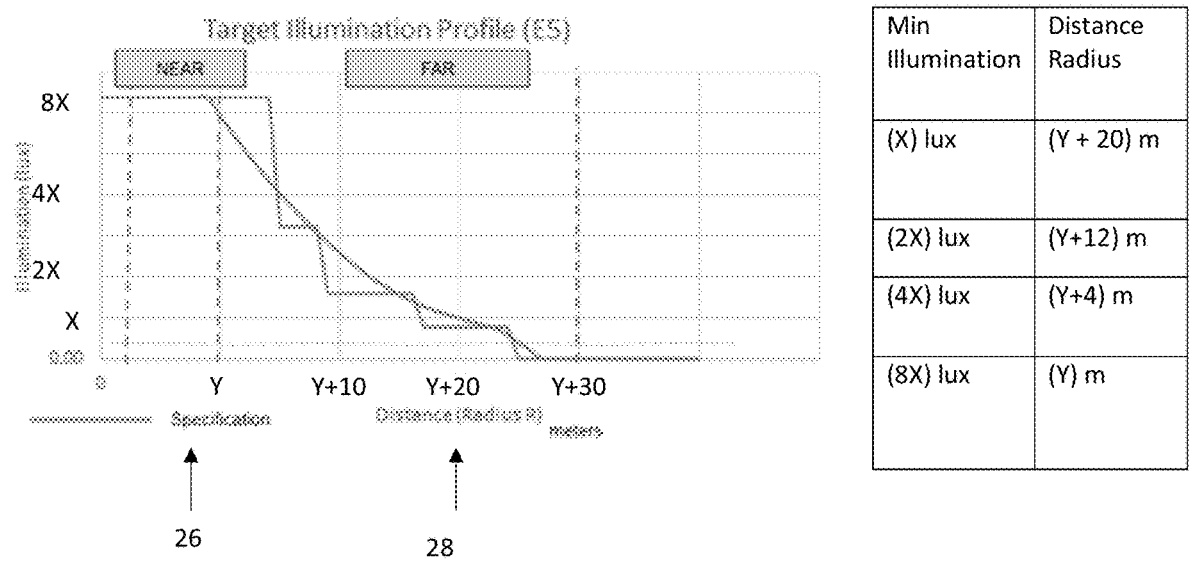
FIG. 23 illustrates an illumination profile of the light system.

FIG. 23 illustrates an illumination profile (intensity) of a light bank over distance. As shown, the near lights 26 have a higher flux than the far lights 28 as the near lights 26 are measured at a lower distance. The chart illustrates the amount of lux is inversely proportional to the distance.

Figure 24:
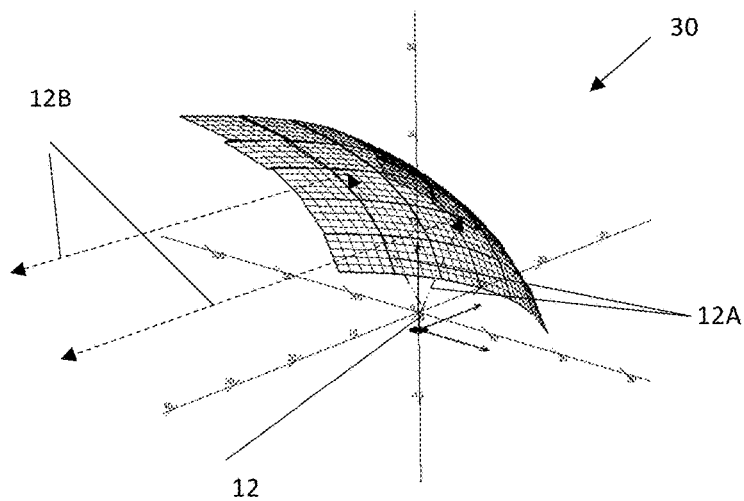
FIG. 24 illustrates an example of a reflector.

FIG. 24 illustrates a reflector 30 located proximate to a light source 12. The light source 12 produces direct light 12A that travels from the light source 12 into contact with the reflector 30 and is reflected outward away from the reflector 30 as reflected light 12B. The reflector 30 may be moved about the axes as shown to aim the reflected light 12B.

Figure 25:
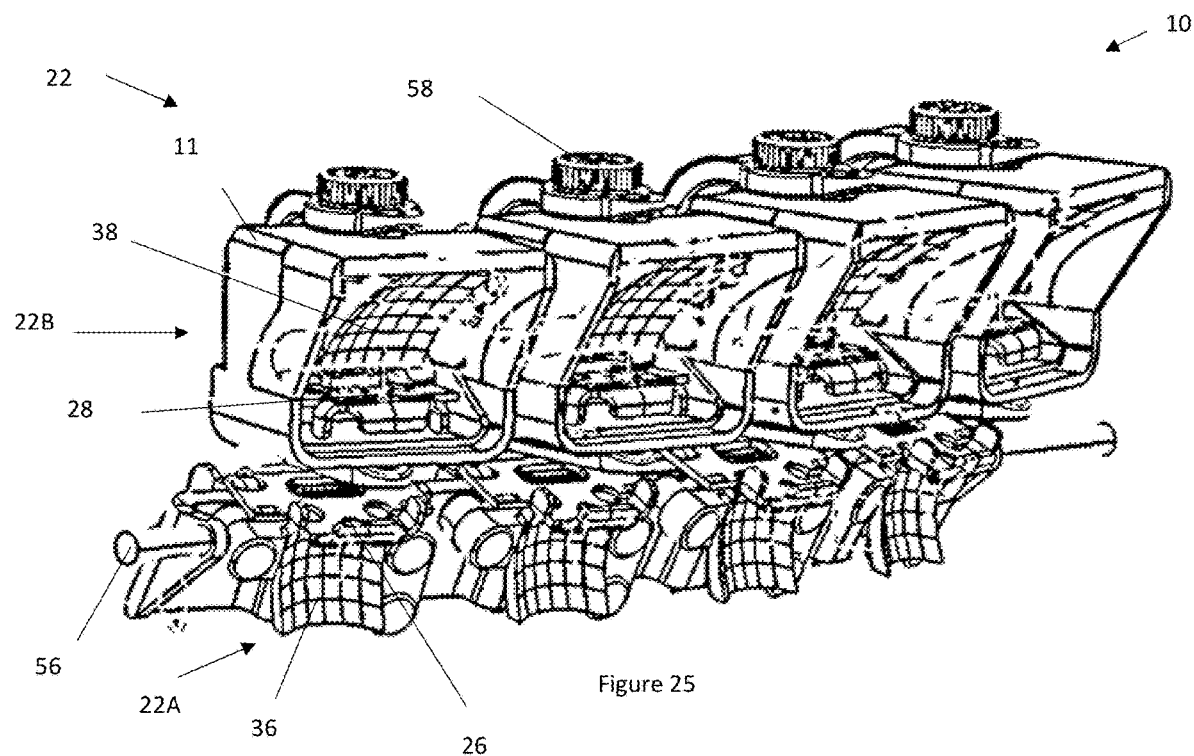
FIG. 25 illustrates an example of a light system including reflectors.

FIG. 25 illustrates a light bank 22 of a light system 10. The light bank 22 includes a baffle 11 housing a near light bank 22A and a far light bank 22B. The near light bank 22A includes a near light 26 and a near reflector 36. Light from the near light 26 is directed towards the near reflector 36 and the near reflector 36 directs the light outward to illuminate a region. The near light bank 22A is adjustable with a near light adjustment 56 so that the light from the near light may be moved up, down, or an individual near reflector 36 may be moved. The far light bank 22B includes far lights 28 and a far reflector 38. Light from the far lights 28 are directed towards the far reflector 38 and then the far reflector 38 reflects the light outward away from the light system 10 and a vehicle (not shown). The far lights 28 and the far reflectors 38 are adjusted with a far light adjustment 58 so that light may be moved up, down, or an individual far reflector 38 may be moved relative to the other reflectors.

Figure 26:
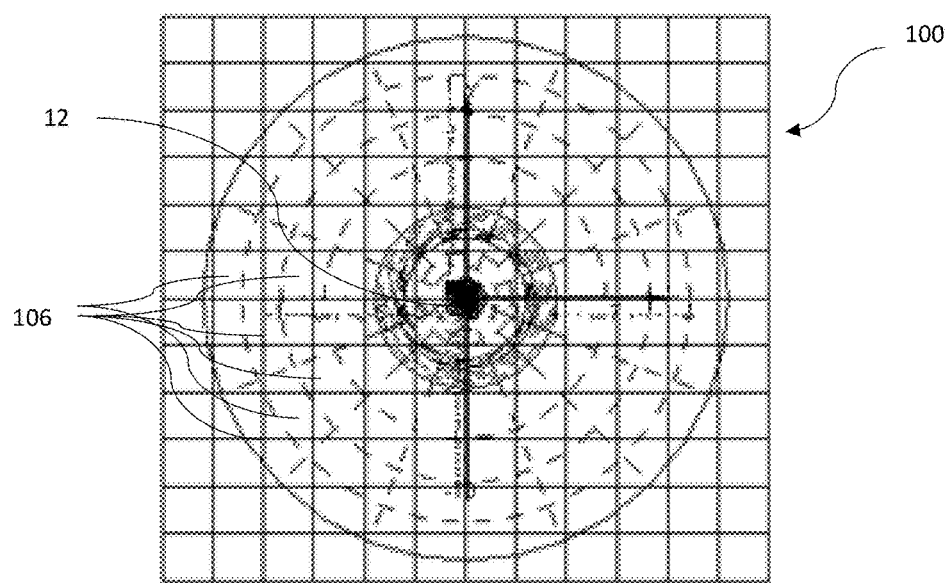
FIG. 26 is a top view of a collimator and light source.

FIG. 26 is a top view of the collimator 100 and the light source 12 within the collimator 100. As illustrated, the collimator 100 includes a plurality of facts 106 that direct the light from the light source 12 to a predetermined location.

Figure 27:
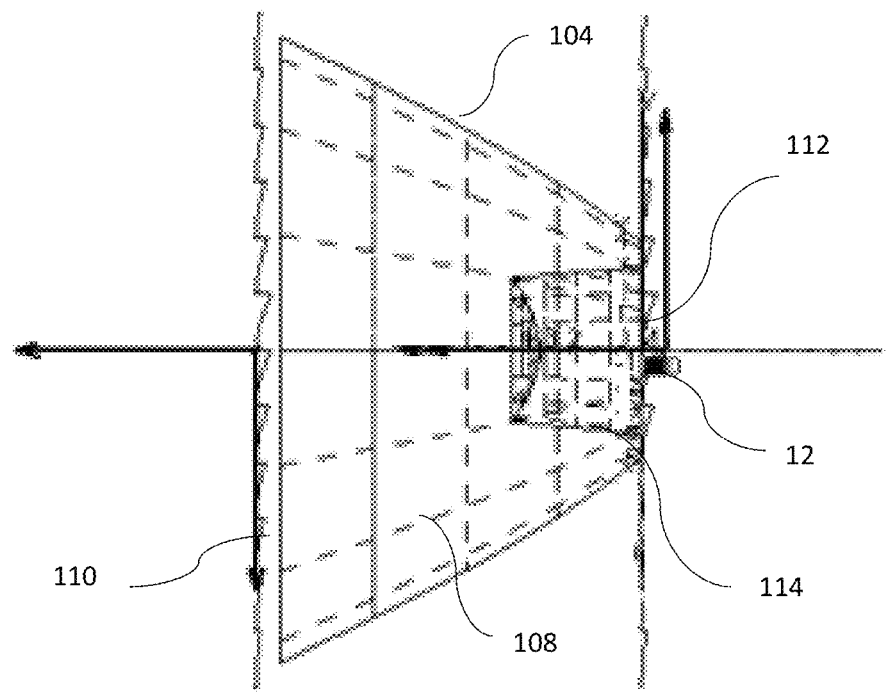
FIG. 27 is a side view of a collimator.

FIG. 27 is a side view of a far collimator 104 and light source 12. The far collimator 104 includes a sidewall 108, cover 110, and end 112 having a recess 114.

Figure 28:
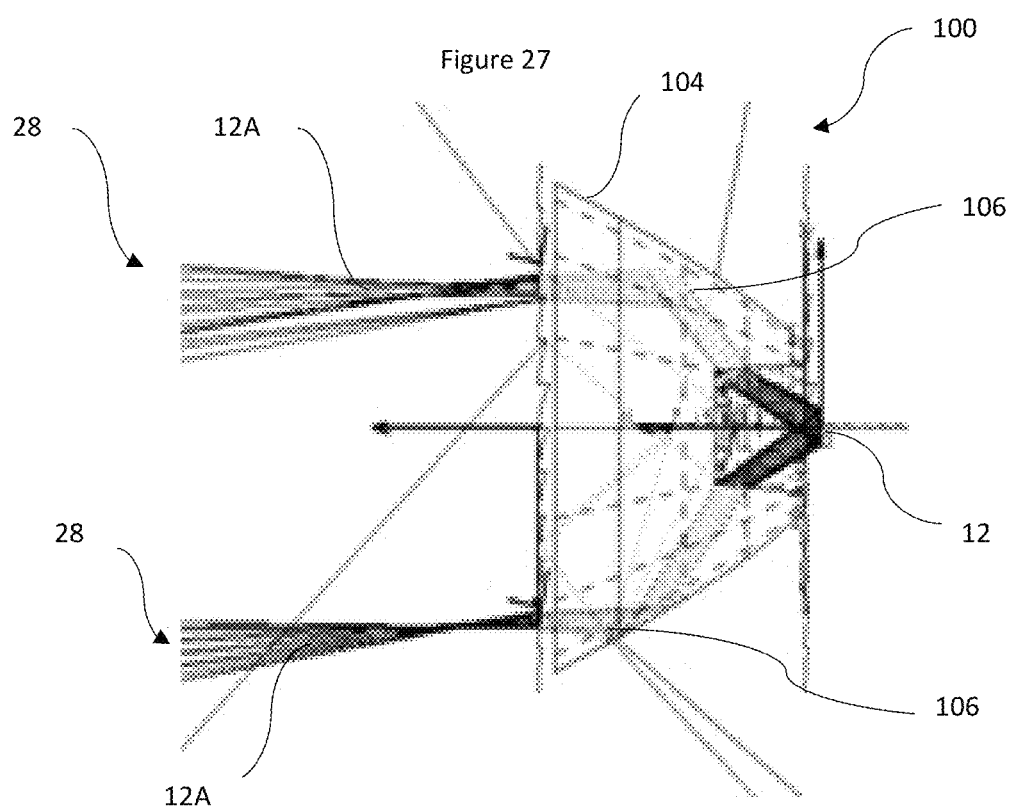
FIG. 28 illustrates light being directed from a collimator.

FIG. 28 illustrates far light 28 extending out of the collimator 100, which as shown is a far collimator 104. The light from the light source 12 extends into contact with the facets 106 of the collimator 100 and then is directed out of the collimator 100 as direct light 12A.

Figure 29:
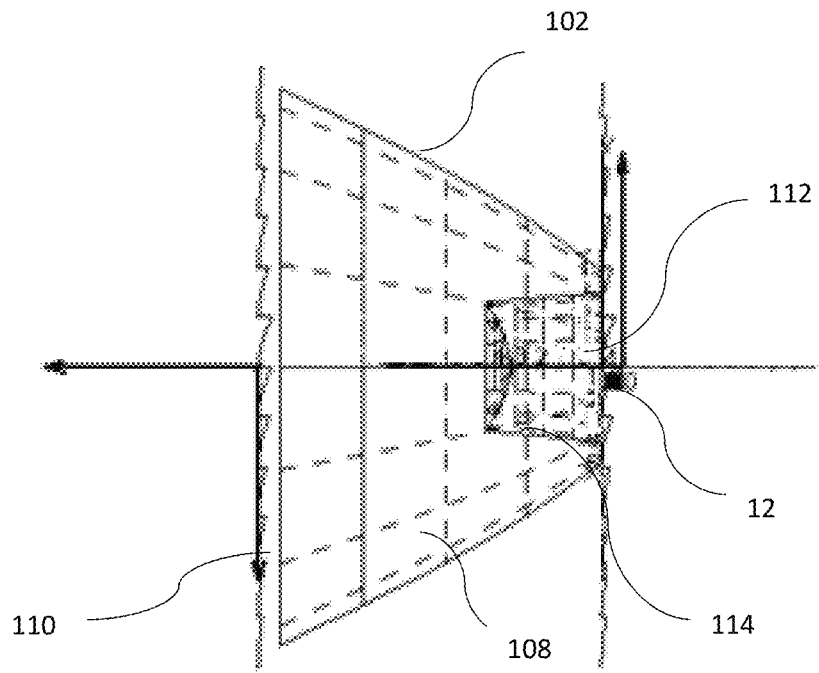
FIG. 29 is a side view of a collimator.

FIG. 29 is a side view of a near collimator 102 and a light source 12. The near collimator 102 includes a sidewall 108, cover 110, and end 112 having a recess 114.

Figure 30:
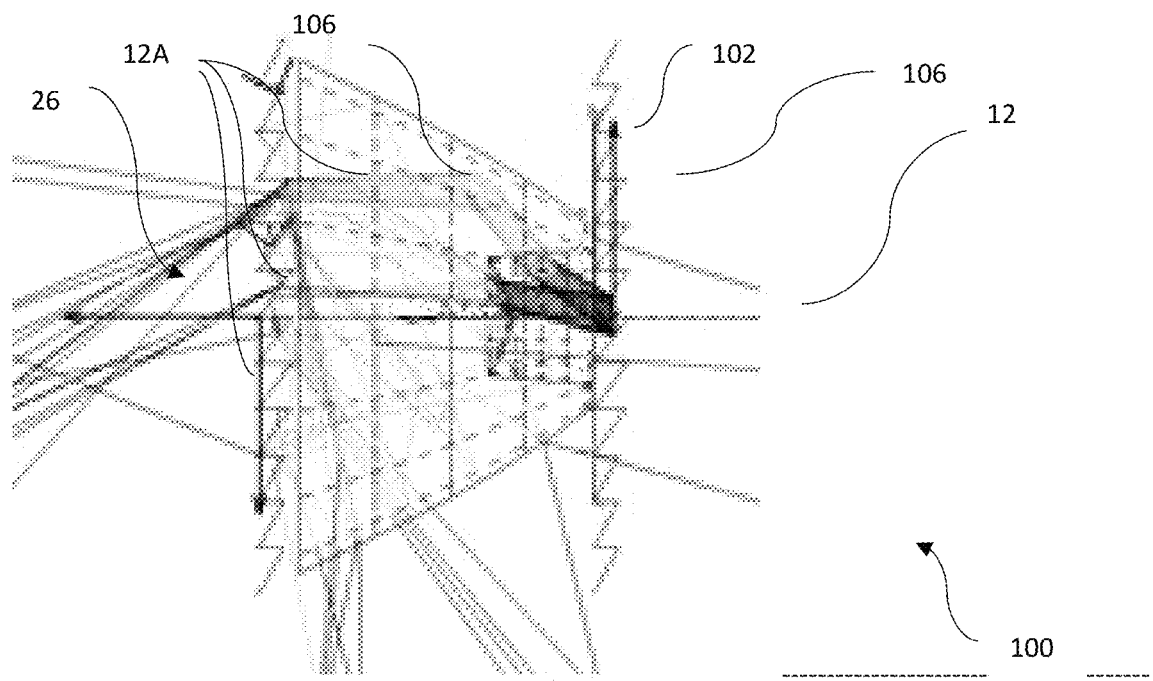
FIG. 30 illustrates light being directed from a collimator.

FIG. 30 illustrates near light 26 extending out of the collimator 100, which as shown is a near collimator 102. The light from the light source 12 extends into contact with the facets 106 of the collimator 100 and then is directed out of the collimator 100 as direct light 12A. The near collimator 102 includes facets 106 that redirect the light passing through the near collimator 102.

Figure 31:
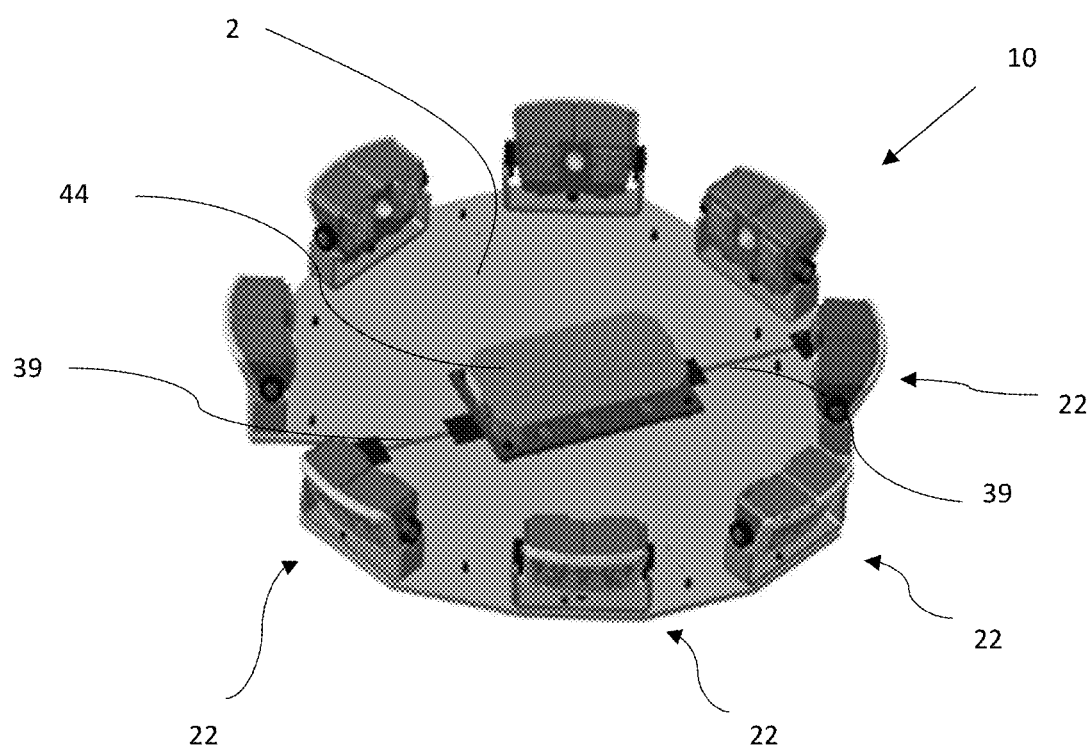
FIG. 31 is an example of a light system.

FIG. 31 illustrates a light system 10 connected to a vehicle 2. The light system includes a plurality of light banks 22 connected to a controller 44 via wire harnesses 39.

Variation 1 comprises a light system comprising: (a) a base that is configured to connect to a vehicle; (b) a light layer that is movable into the base in a closed configuration and out of the base in an open configuration; and (c) a cap located above the base and the light layer, the cap enclosing the light layer within the base when the light system is in the closed configuration.

Variation 2 may comprise the light system of variation 1 and further includes wherein the light system includes an axis and the light layer moves axially along the axis when moving between the open configuration and the closed configuration.

Variation 3 may comprise the light system of variation 1 or 2 and further includes wherein the light layer includes a plurality of light sources and the light sources extend around a periphery of the light layer.

Variation 4 may comprise the light system of variation 1 or any of variations 1 through 3 and further includes wherein the light system is generally circular or the light layer includes a generally circular periphery.

Variation 5 may comprise the light system of variation 1 or any of variations 1 through 4 and further includes wherein a sleeve is located between the base and the light layer.

Variation 6 may comprise the light system of variation 5 or any of variations 1 through 5 and further includes wherein in a closed configuration the light layer is fully or partially nested within the sleeve and the sleeve is fully or partially nested within the base.

Variation 7 may comprise the light system of variation 1 or any of variations 1 through 6 and further includes wherein a plurality of locks connect the cap and the base so that during movement of the light system from one location to another location the cap is prevent from axially moving away from the base.

Variation 8 may comprise the light system of variation 1 or any of variations 1 through 7 and further includes wherein the light layer includes a plurality of light banks that extend around a periphery of the light layer.

Variation 9 may comprise the light system of variation 8 or any of variations 1 through 8 and further includes wherein the plurality of light banks each include one or more near lights and one or more far lights.

Variation 10 may comprise the light system of variation 8 or any of variations 1 through 9 and further includes wherein the plurality of light banks are separated by one or more connectors.

Variation 11 may comprise a light system comprising: (a) a base; (b) a light layer including a plurality of lights that project light substantially around a periphery of the light system; (c) a cleaning system located completely or partially within the base, the cleaning system being configured to clean the light layer; and a cap located above the light layer and may comprise the light system of any of variations of 1 through 10.

Variation 12 may comprise the light system of variation 11 or any of variations 1 through 11 and further includes wherein the light system includes an axis and the light layer, the cap, or both are axially movable along the axis into and out of the base.

Variation 13 may comprise the light system of variation 11 or any of variations 1 through 12 and further includes wherein the light system is movable between an open configuration and a closed configuration.

Variation 14 may comprise the light system of variation 13 or any of variations 1 through 13 and further includes wherein the cleaning system cleans the light layer as the light layer moves between the open configuration and the closed configuration or while the light layer is in the closed configuration.

Variation 15 may comprise the light system of variation 14 or any of variations 1 through 14 and further includes wherein the cleaning system is a mechanical cleaner.

Variation 16 may comprise the light system of variation 14 or any of variations 1 through 15 and further includes wherein the cleaning system includes fluid for cleaning.

Variation 17 may comprise the light system of variation 16 or any of variations 1 through 16 and further includes wherein the fluid is water and the water is sprayed at the light layer or extends over the light layer to remove dirt, debris, or both.

Variation 18 may comprise the light system of variation 16 or any of variations 1 through 17 and further includes wherein the light layer includes a plurality of light banks and a plurality of connectors.

Variation 19 may comprise the light system of variation 18 or any of variations 1 through 18 and further includes wherein some or all of the plurality of connectors include ports and the fluid extends through the ports to clean the plurality of light banks within the light layer.

Variation 20 may comprise the light system of variation 11 or any of variations 1 through 19 and further includes wherein the cleaning system includes a fluid reservoir that holds fluid so that the cleaning system can hydraulically clean the light layer.

Variation 21 may comprise a light system comprising: (a) a plurality of light sources connected to a vehicle and creating light that radiates away from the vehicle so that the light substantially surrounds the vehicle; and (b) one or more sensors that detect light from another light source; and wherein one or more of the plurality of light sources are turned off in a direction of the another light source while some of the plurality of light sources remain on so that a tunnel having a reduction or absence of light is formed in the direction of the another light source between the plurality of light sources that remain on and may comprise the light system of any of variations of 1 through 20.

Variation 22 may comprise the light system of variation 21 or any of variations 1 through 21 and further includes wherein the plurality of light sources are two or more light banks and each of the light banks include two or more lights.

Variation 23 may comprise the light system of variation 22 or any of variations 1 through 22 and further includes wherein the plurality of light sources are 16 or more light source.

Variation 24 may comprise the light system of variation 21 or any of variations 1 through 23 and further includes wherein the plurality of light sources are a plurality of light banks and some of the plurality of light banks include one or more near light banks and one or more far light banks.

Variation 25 may comprise the light system of variation 24 or any of variations 1 through 24 and further includes wherein one or more lights in the one or more far light banks are turned off to form the tunnel.

Variation 26 may comprise the light system of variation 24 or any of variations 1 through 25 and further includes wherein the one or more lights in the one or more near light banks remain on when the tunnel is created.

Variation 27 may comprise the light system of variation 24 or any of variations 1 through 26 and further includes wherein the plurality of light banks are four or more light banks and each of four or more light banks comprise at least one of the one or more near light banks and at least one of the one or more far light banks, wherein each of the one or more far light banks include four or more far light sources and each of the one or more near light banks include four or more near light sources.

Variation 28 may comprise the light system of variation 21 or any of variations 1 through 27 and further includes wherein the plurality of light sources are located around the vehicle so that light extends 360 degrees around the vehicle.

Variation 29 may comprise the light system of variation 21 or any of variations 1 through 28 and further includes wherein each of the plurality of light sources are aligned with one reflector and direct light towards the one reflector so that the one reflector reflects the light from the respective one of the plurality of lights outward away from the vehicle.

Variation 30 may comprise the light system of variation 21 or any of variations 1 through 29 and further includes wherein each of the plurality of lights is in communication with one collimator and direct light into the respective collimator and the collimator direct light to a predetermined region outward away from the vehicle.

Variation 31 may comprise a light system comprising: (a) a plurality of light banks comprising: (i) one or more near lights and (ii) one or more far lights that operate at a same time as the one or more near lights to lighten a segment around a vehicle; wherein the one or more near lights, lighten a region of the segment from the vehicle to a first distance from the vehicle and the one or more far lights, lighten a second region of the segment from the first distance to a second distance; and wherein the plurality of light banks project light outward so that the light substantially surrounds the vehicle and may comprise the light system of any of variations of 1 through 30.

Variation 32 may comprise the light system of variation 31 or any of variations 1 through 31 and further includes wherein the one or more near lights and the one or more far lights of each of the plurality of light banks are four or more near lights and four or more far lights and each of the four or more near lights lighten a different segment around the vehicle, and at least one of the four or more far lights lighten a same segment as one of the four or more near lights.

Variation 33 may comprise the light system of variation 31 or any of variations 1 through 32 and further includes wherein the plurality of light banks are eight or more light banks.

Variation 34 may comprise the light system of variation 31 or any of variations 1 through 33 and further includes wherein the one or more near lights provide light at a first intensity and the one or more far lights provide light at a second intensity that is three times or more the first intensity.

Variation 35 may comprise the light system of variation 31 or any of variations 1 through 34 and further includes wherein each of the one or more far lights within each of the plurality of light banks are controllable separate from the one or more near lights so that the one or more far lights when turned off create a tunnel in the light while the one or more near lights continue to provide light.

Variation 36 may comprise the light system of variation 31 or any of variations 1 through 35 and further includes wherein the one or more far lights shine light at an angle of about 25 degrees to about parallel relative to a plane parallel to the ground.

Variation 37 may comprise the light system of variation 31 or any of variations 1 through 36 and further includes wherein the one or more near lights shine at an angle of about 15 degrees to about 85 degrees relative to a plane parallel to the ground.

Variation 38 may comprise the light system of variation 31 or any of variations 1 through 37 and further includes wherein the plurality of light banks include a plurality of light sources and a plurality of reflectors and each of the plurality of light sources are aligned with one of the plurality of reflectors that reflects light from the light source outward away from the vehicle.

Variation 39 may comprise the light system of variation 31 or any of variations 1 through 38 and further includes wherein the plurality of light banks include a plurality of light sources and a plurality of collimators and each of the plurality of light sources are aligned with one of the plurality of collimators that direct light from the light source outward away from the vehicle.

Variation 40 may comprise a method comprising: (a) lighting a plurality of light banks comprising one or more near lights and one or more far lights that operate at a same time so that a plurality of segments around a vehicle are lightened to substantially surround the vehicle with light; (b) sensing light of an oncoming vehicle; (c) selecting one or more of the one or more far lights of the plurality of light banks; and (d) turning off the selected one or more of the one or more far lights to form a tunnel between the one or more far lights that remain on and may comprise the light system of any of variations of 1 through 39.

Variation 41 may comprise the method of variation 40 or any of variations 1 through 40 and further includes wherein each of the plurality of light banks include four or more of the one or more far lights and two or more of the four or more far lights are turned off.

Variation 42 may comprise the method of variation 40 or any of variations 1 through 41 and further includes wherein the tunnel is about 5 degrees wide or more.

Variation 43 may comprise the method of variation 40 or any of variations 1 through 42 and further includes wherein the one or more far lights turned off changes as the oncoming vehicle approaches and passes the vehicle.

Variation 44 may comprise the method of variation 40 or any of variations 1 through 43 and further includes wherein a size of the tunnel varies depending on an intensity of light measured by a sensor of a light system that includes the plurality of light banks.

Variation 45 may comprise the method of variation 40 or any of variations 1 through 44 and further includes wherein the plurality of light banks include a plurality of light sources and a plurality of reflectors and each of the plurality of light sources are aligned with one of the plurality of reflectors that reflects light from the light source outward away from the vehicle.

Variation 46 may comprise the method of variation 40 or any of variations 1 through 45 and further includes wherein the plurality of light banks include a plurality of light sources and a plurality of collimators and each of the plurality of light sources are aligned with one of the plurality of collimators that direct light from the light source outward away from the vehicle.

Variation 47 may comprise the method of variation 40 through 46 or any of variations 1 through 45 and may include a light system comprising: a plurality of light sources connected to a vehicle and creating light that radiates away from the vehicle in a forward direction and one additional direction so that the light substantially surrounds two sides the vehicle; and one or more sensors that detect light from another light source; and wherein one or more of the plurality of light sources are turned off in a direction of the another light source while some of the plurality of light sources remain on so that a tunnel having a reduction or absence of light is formed in the direction of the another light source between the plurality of light sources that remain on.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
10 Light System
11 Baffle
12 Light Source
12A Direct Light
12B Reflected Light
14 Connector
16 Near region
18 Far region
20 Direction of Movement
22 Light Bank
22A Near Light Bank
22B Far Light Bank
24 Port
26 Near Lights
28 Far Lights
30 Reflector
32 Light On
34 Light Off
36 Near reflector
38 Far reflector
39 Wire Harness
40 X-X+1 Segment
42 Sensor
44 Controller
46 Tunnel
48 Lamp Axis
50 Reflector Axis
52 Near Light Plane
56 Near light Adjustment
58 Far light Adjustment
60 Periscope
62 Cap
64 Light Layer
66 Sleeve
68 Base
70 Locks
72 Platform
74 Cleaning System
76 Cavity
78 Nozzle
80 Fluid
82 Fluid Distributor/Fluid Reservoir
84 Fluid Line
86 Brush
90 Open Configuration
92 Closed Configuration/Cleaning Configuration
100 Collimator
102 Near Collimator
104 Far Collimator
106 Facets
108 Sidewall
110 Cover
112 End
114 Recess

We claim:
1. A light system comprising:
a plurality of light sources configured to connect to a vehicle and create light that radiates away from the vehicle so that the light substantially surrounds the vehicle, wherein the plurality of light sources comprise:
a plurality of near lights that project light a first distance and
a plurality of far lights that project light a second distance that is greater than first distance;
one or more sensors that detect light from another light source;
a cap;
a base; and
a light layer comprising the plurality of light sources, wherein the light layer is located between the cap and the base;
wherein one or more of the plurality of far lights are turned off in a direction of the another light source while some of the plurality of near lights and a remainder of the plurality of far lights remain on so that a tunnel having a reduction or absence of light is formed in the direction of the another light source; and
wherein the light layer is movable into the base into a closed configuration so that the cap creates a lid over the base.

2. The light system of claim 1, wherein the base includes a plurality of locks that lock the cap and base together when the light system is in the closed configuration.

3. The light system of claim 2, further comprising a sleeve located between the light layer and the base, wherein the light layer extends into the sleeve and the base when the light system is in the closed configuration.

4. The light system of claim 1, wherein the plurality of light sources are a plurality of light banks that each include some of the plurality of near lights and some of the plurality of far lights.

5. The light system of claim 4, wherein the plurality of light banks are four or more light banks and each of four or more light banks comprise at least one of the plurality of near lights and at least one of the plurality of far lights.

6. The light system of claim 1, wherein the light system is substantially sealed when the light system is in the closed configuration.

7. The light system of claim 1, wherein the plurality of light sources are located around the vehicle so that light extends 360 degrees around the vehicle.

8. The light system of claim 1, wherein the base includes controls, electronics, controllers, motors, or a combination thereof of the light system.

9. The light system of claim 1, wherein the base is connected to a platform that is connectable directly to the vehicle.

10. A light system comprising:
a light layer that extends 360 degrees around the light system, the light layer comprising:
one or more near lights that lighten a region from a vehicle to a first distance from a vehicle;
one or more far lights that operate at a same time as the one or more near lights to lighten a segment around a vehicle, wherein the one or more far lights lighten a second region from the vehicle to a second distance from the vehicle;
a cleaning system extending around the light layer so that the cleaning system is configured to clean the 360 degrees of the light layer, wherein the cleaning system cleans pneumatically, hydrologically, mechanically, or a combination thereof;
a cap located above the light layer; and
a base located below the light layer;
wherein the light layer projects light outward so that the light is projected 360 degrees around the vehicle.

11. The light system of claim 10, wherein the light system is movable between an open configuration and a closed configuration.

12. The light system of claim 11, wherein the cleaning system cleans the light layer as the light layer moves between the open configuration and the closed configuration or while the light layer is in the closed configuration.

13. The light system of claim 10, wherein the one or more near lights provide light at a first intensity and the one or more far lights provide light at a second intensity that is three times or more the first intensity.

14. The light system of claim 10, wherein each of the one or more far lights within each of a plurality of light banks are controllable separate from the one or more near lights so that the one or more far lights when turned off create a tunnel in the light while the one or more near lights continue to provide light.

15. The light system of claim 10, wherein the cleaning system is a mechanical cleaner that includes brushes or bristles that mechanically clean.

16. The light system of claim 10, wherein the cleaning system includes water and the water is sprayed at the light layer or water is run over the light layer to remove dirt, debris, or both so that the water hydraulically cleans.

17. The light system of claim 10, wherein the cleaning system includes a fluid reservoir that holds fluid so that the cleaning system can hydraulically clean the light layer.

18. A method comprising:
lighting a plurality of light banks comprising one or more near lights and one or more far lights that operate at a same time so that a plurality of segments around a vehicle are lightened to substantially surround the vehicle with light, wherein the plurality of light banks extend 360 degrees within a light system;
sensing light from another light source with one or more sensors;
turning off some of the one or more far lights when the one or more sensors sense the light from the another light source so that a tunnel having a reduction or absence of light is formed in the direction of the light from the another light source;
moving the plurality of light banks between an open configuration and a closed position;
moving the plurality of light banks into the closed position; and
cleaning the plurality of light banks with a cleaning system and the cleaning system extends 360 degrees so that the cleaning system extends around the plurality of light bands that extend 360 degrees.

19. The method of claim 18, wherein the cleaning system is a mechanical cleaner that includes brushes or bristles so that as the plurality of light banks move between the open configuration and the closed position the mechanical cleaner cleans the plurality of light banks.

20. The light system of claim 10, wherein the cleaning system cleans pneumatically by moving a fluid through one or more ports towards the light layer so that the fluid is positively moved around the light layer so that dirt, dust, debris, or combination thereof are prevented from settling upon the light layer.

* * * * *